(12) United States Patent
Finnegan et al.

(10) Patent No.: US 12,286,380 B2
(45) Date of Patent: Apr. 29, 2025

(54) SHAPED ARTIFICIAL POLYMER ARTICLES

(71) Applicant: BASF SE, Ludwigshafen am Rhein (DE)

(72) Inventors: Gerard R. Finnegan, Tarrytown, NY (US); Thomas F. Thompson, Tarrytown, NY (US); Juan Carlos Capote, Tarrytown, NY (US); Rupa Hiremath Darji, Tarrytown, NY (US)

(73) Assignee: BASF SE, Ludwigshafen am Rhein (DE)

( * ) Notice: Subject to any disclaimer, the term of this patent is extended or adjusted under 35 U.S.C. 154(b) by 899 days.

(21) Appl. No.: 17/605,482

(22) PCT Filed: Mar. 9, 2020

(86) PCT No.: PCT/EP2020/056173
§ 371 (c)(1),
(2) Date: Oct. 21, 2021

(87) PCT Pub. No.: WO2020/182709
PCT Pub. Date: Sep. 17, 2020

(65) Prior Publication Data
US 2022/0144712 A1 May 12, 2022

Related U.S. Application Data

(60) Provisional application No. 62/817,192, filed on Mar. 12, 2019.

(51) Int. Cl.
*C04B 38/00* (2006.01)
*C04B 35/626* (2006.01)
*C04B 38/06* (2006.01)

(52) U.S. Cl.
CPC ...... *C04B 38/009* (2013.01); *C04B 35/62655* (2013.01); *C04B 38/0054* (2013.01);
(Continued)

(58) Field of Classification Search
CPC ............ C04B 2103/606; C04B 38/009; C04B 35/01; C04B 38/0054; C04B 38/0074;
(Continued)

(56) References Cited

U.S. PATENT DOCUMENTS

| | | | |
|---|---|---|---|
| 9,358,533 | B2 | 6/2016 | Tran et al. |
| 9,985,273 | B2 | 5/2018 | Sun et al. |
| 2010/0247663 | A1 | 9/2010 | Day |

(Continued)

FOREIGN PATENT DOCUMENTS

| | | |
|---|---|---|
| CN | 101670280 A | 3/2010 |
| CN | 108384061 A | 8/2018 |

(Continued)

OTHER PUBLICATIONS

International Search Report for PCT/EP2020/056173 mailed May 29, 2020, 3 pgs.

(Continued)

*Primary Examiner* — James C Yager
(74) *Attorney, Agent, or Firm* — Lowenstein Sandler LLP

(57) ABSTRACT

Use of porous metal oxide microspheres as light stabilizers for shaped artificial polymer articles, wherein the porous metal oxide microspheres are prepared via a process comprising forming a liquid dispersion of polymer nanoparticles and a metal oxide; forming liquid droplets of the dispersion; drying the droplets to provide polymer template microspheres comprising polymer nanospheres; and removing the polymer nanospheres from the template microspheres to provide the porous metal oxide microspheres.

13 Claims, 12 Drawing Sheets

(52) U.S. Cl.
CPC ............... *C04B 38/0655* (2013.01); *C04B 2235/3232* (2013.01); *C04B 2235/3284* (2013.01); *C04B 2235/3418* (2013.01); *C04B 2235/528* (2013.01); *C04B 2235/5436* (2013.01)

(58) Field of Classification Search
CPC ............... C04B 38/0655; C04B 26/02; C04B 20/002; C04B 26/04; C04B 20/0036; C08K 7/26; C08L 23/12
See application file for complete search history.

(56) References Cited

U.S. PATENT DOCUMENTS

| | | |
|---|---|---|
| 2010/0264097 A1 | 10/2010 | Sun |
| 2014/0329673 A1 | 11/2014 | Ritchie et al. |
| 2016/0143831 A1 | 5/2016 | Brock et al. |

FOREIGN PATENT DOCUMENTS

| | | |
|---|---|---|
| RU | 2185880 C1 | 7/2002 |
| WO | 2012058044 A1 | 5/2012 |
| WO | 2015/027880 A1 | 3/2015 |

OTHER PUBLICATIONS

Shchukin et al., "Template Synthesis and Photocatalytic Properties of Porous Metal Oxide Spheres Formed by Nanoparticle Infiltration," Chem Mater. 2004, pp. 2287-2292, vol. 16.

Zhang et al., "Synthesis of Hierarchically Porous Silica and Metal Oxide Beads Using Emulsion-Templated Polymer Scaffolds," Chem Mater. 2004, pp. 4245-4256, vol. 16.

SHAPED ARTIFICIAL POLYMER ARTICLES

The present invention relates to the use of specific porous metal oxide spheres (e.g., microspheres) as light stabilizers for a shaped artificial polymer article, and corresponding shaped artificial polymer articles and corresponding extruded, casted, spun, molded or calendered polymer compositions.

Certain porous metal oxide spheres have now been found to be especially efficacious towards stabilizing polymers against degradation, especially degradation induced by UV light. In addition, it has been found that these show a synergistic effect with respect to such stabilization in combination with other UV absorbers.

The present invention relates in particular to the use of porous metal oxide spheres as light stabilizers for a shaped artificial polymer article, wherein the polymer is a synthetic polymer and/or a natural or synthetic elastomer and the porous metal oxide spheres comprise a metal oxide and are prepared, e.g., by a method comprising forming a liquid dispersion of polymer particles (e.g., nanoparticles) and a metal oxide;

forming liquid droplets of the dispersion;

drying the liquid droplets to provide polymer template-spheres (e.g., microspheres) comprising polymer spheres (e.g., nanospheres) and metal oxide; and removing the polymer spheres from the template microspheres to provide the porous metal oxide spheres, and wherein the spheres have, e.g., an average diameter of from 0.5 μm to 100 μm, an average porosity of from 0.10 to 0.80 and an average pore diameter of from 50 nm to 999 nm.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Present porous metal oxide spheres, or photonic balls, may be prepared with the use of a polymeric sacrificial template. In one embodiment, an aqueous colloid dispersion containing polymer particles and a metal oxide is prepared, the polymer particles typically being nano-scaled. The aqueous colloidal dispersion cab be mixed with a continuous oil phase, for instance within a microfluidic device, to produce a water-in-oil emulsion. Emulsion aqueous droplets are prepared, collected and dried to form spheres (typically microscaled) containing polymer particles and metal oxide. The polymer particles (spheres) are then removed, for instance via calcination, to provide spherical, metal oxide particles (spheres) containing a high degree of porosity and pores that are typically nanoscaled. The spheres may contain uniform pore diameters, a result of the polymer particles being spherical and monodisperse.

Figure 1:
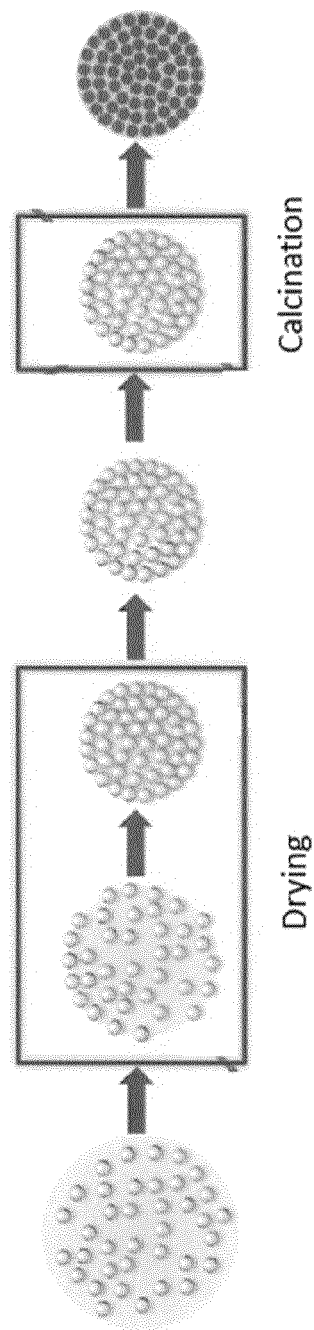
FIG. 1 shows a general outline for the preparation of porous microspheres according to an embodiment of the invention.

FIG. 1 shows a general outline for the preparation of present porous microspheres. An emulsion droplet containing polymer nanospheres and metal oxide is dried to remove solvent, providing an assembled microsphere containing polymer nanospheres with metal oxide in the interstitial spaces between the polymer nanospheres (template microsphere or "direct structure"). The polymer nanospheres define the interstitial space. Calcination results in removal of the polymer, providing a present metal oxide microsphere with high porosity, or void volume (inverse structure).

The porous metal oxide spheres are advantageously sintered, resulting in a continuous solid structure which is thermally and mechanically stable.

In some embodiments, droplet formation and collection occurs within a microfluidic device. Microfluidic devices are for instance narrow channel devices having a micron-scaled droplet junction adapted to produce uniform size droplets connected to a collection reservoir. Microfluidic devices for example contain a droplet junction having a channel width of from about 10 μm to about 100 μm. The devices are for instance made of polydimethylsiloxane (PDMS) and may be prepared for example via soft lithography. An emulsion may be prepared within the device via pumping an aqueous dispersed phase and oil continuous phase at specified rates to the device where mixing occurs to provide emulsion droplets. Alternatively, an oil-in-water emulsion may be employed.

In some embodiments, vibrating nozzle techniques may be employed. In these techniques, a liquid dispersion is prepared, droplets are formed and are dropped into a bath of a continuous phase. The droplets are then dried followed by removal of the polymer. Vibrating nozzle equipment is available from Buchi and comprises for instance a syringe pump and a pulsation unit. Vibrating nozzle equipment may also comprise a pressure regulation valve.

The polymer particles for instance have an average diameter of from about 50 nm to about 999 nm and are monodisperse.

Suitable template polymers for the spheres include thermoplastic polymers. For example, template polymers are selected from the group consisting of poly(meth)acrylic acid, poly(meth)acrylates, polystyrenes, polyacrylamides, polyvinyl alcohol, polyvinyl acetate, polyesters, polyurethanes, polyethylene, polypropylene, polylactic acid, polyacrylonitrile, polyvinyl ethers, derivatives thereof, salts thereof, copolymers thereof and combinations thereof. For example, the polymer is selected from the group consisting of polymethyl methacrylate, polyethyl methacrylate, poly(n-butyl methacrylate), polystyrene, poly(chloro-styrene), poly(alpha-methylstyrene), poly(N-methylolacrylamide), styrene/methyl methacrylate copolymer, polyalkylated acrylate, polyhydroxyl acrylate, polyamino acrylate, polycyanoacrylate, polyfluorinated acrylate, poly(N-methylolacrylamide), polyacrylic acid, polymethacrylic acid, methyl methacrylate/ethyl acrylate/acrylic acid copolymer, styrene/methyl methacrylate/acrylic acid copolymer, polyvinyl acetate, polyvinylpyrrolidone, polyvinylcaprolactone, polyvinylcaprolactam, derivatives thereof, salts thereof, and combinations thereof.

In certain embodiments, polymer templates include polystyrenes, including polystyrene and polystyrene copolymers. Polystyrene copolymers include copolymers with water-soluble monomers, for example polystyrene/acrylic acid, polystyrene/poly(ethylene glycol) methacrylate, and polystyrene/styrene sulfonate.

Present metal oxides include oxides of transition metals, metalloids and rare earths, for example silica, titania, alumina, zirconia, ceria, iron oxides, zinc oxide, indium oxide, tin oxide, chromium oxide, mixed metal oxides, combinations thereof, and the like. Preferred are metal oxides selected from the group consisting of silica, titania, alumina and combinations thereof.

The wt/wt (weight/weight) ratio of polymer particles to metal oxide is for instance from 0.1/1 to 10.0/1 or from 0.5/1 to 10.0/1.

The continuous oil phase comprises for example an organic solvent, a silicone oil or a fluorinated oil. According to the invention "oil" means an organic phase immiscible with water. Organic solvents include hydrocarbons, for example, heptane, hexane, toluene, xylene, and the like, as well as alkanols such as methanol, ethanol, propanol, etc.

The emulsion droplets are collected, dried and the polymer is removed. Drying is performed for instance via microwave irradiation, in a thermal oven, under vacuum, in the presence of a desiccant or a combination thereof.

Polymer removal may be performed for example via calcination, pyrolysis or with a solvent (solvent removal). Calcination is performed in some embodiments at temperatures of at least about 200° C., at least about 500° C., at least about 1000° C., from about 200° C. to about 1200° C. or from about 200° C. to about 700° C. The calcining can be for a suitable period, e.g., from about 0.1 hour to about 12 hours or from about 1 hour to about 8.0 hours. In other embodiments, the calcining can be for at least about 0.1 hour, at least about 1 hour, at least about 5 hours or at least about 10 hours.

Alternatively, a liquid dispersion comprising polymer nanoparticles and metal oxide is formed with an oil dispersed phase and a continuous water phase to form an oil-in-water emulsion. The oil droplets may be collected and dried as are aqueous droplets.

Alternatively, a liquid dispersion of polymer particles (e.g., nanoparticles) and metal oxide is prepared and is spray-dried to form the polymer template spheres (e.g., microspheres) without forming a liquid-in-liquid emulsion. In certain embodiments of spray-drying techniques, a liquid solution or dispersion is fed (e.g. pumped) to an atomizing nozzle associated with a compressed gas inlet. The feed is pumped through the atomizing nozzle to form liquid droplets. The droplets are surrounded by a pre-heated gas in an evaporation chamber, resulting in evaporation of solvent to produce solid particles. The dried particles are carried by the drying gas through a cyclone and deposited in a collection chamber. Gases include nitrogen and/or air. In an embodiment of a present spray-drying process, a liquid feed contains a water or oil phase, polymer particles and metal oxide. In an embodiment of a present spray-drying process, a liquid feed contains a water or oil phase, polymer particles and optionally metal oxide. Provided are polymer template spheres containing polymer spheres with metal oxide in the interstitial spaces between the polymer spheres. The polymer spheres define the interstitial spaces. Spray-drying techniques include ink jet spray-drying methods and equipment.

In present spray-drying techniques, air may be considered a continuous phase with a dispersed liquid phase (a liquid-in-gas emulsion). In certain embodiments, spray-drying comprises an inlet temperature of from any of about 100° C., about 105° C., about 110° C., about 115° C., about 120° C., about 130° C., about 140° C., about 150° C., about 160° C. or about 170° C. to any of about 180° C., about 190° C., about 200° C., about 210° C., about 215° C. or about 220° C. In some embodiments a pump rate (feed flow rate) of from any of about 1 mL/min, about 2 mL/min, about 5 mL/min, about 6 mL/min, about 8 mL/min, about 10 mL/min, about 12 mL/min, about 14 mL/min or about 16 mL/min to any of about 18 mL/min, about 20 mL/min, about 22 mL/min, about 24 mL/min, about 26 mL/min, about 28 mL/min or about 30 mL/min is employed. Spray-drying techniques are disclosed for example in US2016/0170091.

Figure 4:
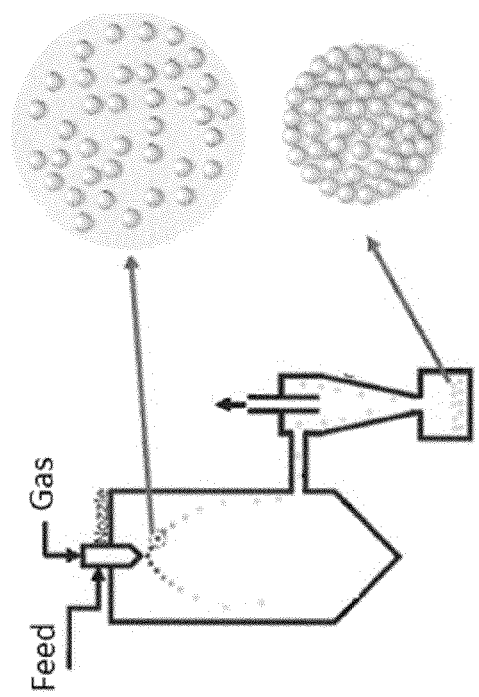
FIG. 4 is a representation of a spray-drying process according to some embodiments of the invention.

FIG. 4 is a representation of a spray-drying process according to some embodiments of the invention.

The spheres are spherical or spherical-like and in certain embodiments are micron-scaled, for example having average diameters from about 0.5 microns ($\mu m$) to about 100 $\mu m$. The polymer particles employed as a template are also spherical, and in certain embodiments are nano-scaled and are monodisperse, having average diameters for instance from about 50 nm to about 999 nm. The metal oxide employed may also be in particle form, which particles may be nano-scaled.

The metal oxide of the dispersion may be provided as metal oxide or may be provided from a metal oxide precursor, for instance via a sol-gel technique.

Drying of the polymer/metal oxide droplets followed by removal of the polymer provides spheres having uniform voids (pores). In general, in the present processes, each droplet provides a single sphere. The pore diameters are dependent on the size of the polymer particles. Some "shrinkage" or compaction may occur upon polymer removal, providing pore sizes somewhat smaller than the original polymer particle size, for example from about 10% to about 40% smaller than the polymer particle size. The pore diameters are uniform as are the polymer particle shape and size.

Pore diameters may range in some embodiments from about 50 nm to about 999 nm.

The average porosity of the present metal oxide spheres may be relatively high. Average porosity of a sphere means the total pore volume, as a fraction of the volume of the entire sphere. Average porosity may be called "volume fraction."

In some embodiments, a porous sphere may have a solid core (center) where the porosity is in general towards the exterior surface of the sphere. In other embodiments, a porous sphere may have a hollow core where a major portion of the porosity is towards the interior of the sphere. In other embodiments, the porosity may be distributed throughout the volume of the sphere. In other embodiments, the porosity may exist as a gradient, with higher porosity towards the exterior surface of the sphere and lower or no porosity (solid) towards the center; or with lower porosity towards the exterior surface and with higher or complete porosity (hollow) towards the center.

For any porous sphere, the average sphere diameter is preferably larger than the average pore diameter, for example, the average sphere diameter is at least about 25 times, at least about 30 times, at least about 35 times, or at least about 40 times larger than the average pore diameter.

In some embodiments, the ratio of average sphere diameter to average pore diameter is for instance from any of about 40/1, about 50/1, about 60/1, about 70/1, about 80/1, about 90/1, about 100/1, about 110/1, about 120/1, about 130/1, about 140/1, about 150/1, about 160/1, about 170/1, about 180/1 or about 190/1 to any of about 200/1, about 210/1, about 220/1, about 230/1, about 240/1, about 250/1, about 260/1, about 270/1, about 280/1, about 290/1, about 300/1, about 310/1, about 320/1, about 330/1, about 340/1 or about 350/1.

Polymer template spheres comprising monodisperse polymer spheres may provide, when the polymer is removed, metal oxide spheres having pores that in general have similar pore diameters.

The average diameter of the spheres (e.g., microspheres) may be from 0.5 μm to 100 μm, or 1 μm to 75 μm or 4.5 μm to 9.9 μm.

The average porosity of the spheres (e.g., microspheres) may be from 0.10 to 0.90, or 0.10 to 0.80 or 0.45 to 0.65.

The average pore diameter of the spheres (e.g., microspheres) may be from 50 nm to 999 nm, from 50 nm to 800 nm and from 220 nm to 300 nm.

Certain embodiments are directed to porous microspheres wherein the microspheres have an average diameter of from 0.5 μm to 100 μm, an average porosity of from 0.10 to 0.90 or from 0.10 to 0.80 and an average pore diameter of from 50 nm to 999 nm.

Other embodiments are directed to porous metal oxide microspheres having an average diameter of from 1 μm to 75 μm, an average porosity of from 0.45 to 0.65, and an average pore diameter of from 50 nm to 800 nm.

Further embodiments are directed to porous metal oxide microspheres having an average diameter of from 4.5 μm to 9.9 μm; an average porosity of from 0.45 to 0.65; and an average pore diameter of from 220 nm to 300 nm.

Without wishing to be bound by theory, it is believed that bulk samples of spheres exhibit absorption when porosity and/or sphere diameter and/or pore diameter are within a certain range.

The porous spheres comprise mainly metal oxide, that is, they may consist essentially of or consist of metal oxide. The amount of metal oxides in the microspheres may be, e.g., 50 to 99.9 weight-%, based on the weight of the microsphere. Certain embodiments have a lower limit of 60 weight-%, or 70 weight-% or 90 weight-% or 95 weight-%.

Advantageously, the porous spheres (e.g., microspheres) may also be monodisperse.

According to the invention, particle size is synonymous with particle diameter and is determined for instance by scanning electron microscopy (SEM) or transmission electron microscopy (TEM). Average particle size is synonymous with D50, meaning half of the population resides above this point, and half below. Particle size refers to primary particles. Particle size may be measured by laser light scattering techniques, with dispersions or dry powders.

Mercury porosimetry analysis was used to characterize the porosity of the microspheres. Mercury porosimetry applies controlled pressure to a sample immersed in mercury. External pressure is applied for the mercury to penetrate into the voids/pores of the material. The amount of pressure required to intrude into the voids/pores is inversely proportional to the size of the voids/pores. The mercury porosimeter generates volume and pore size distributions from the pressure versus intrusion data generated by the instrument using the Washburn equation. For example, porous silica microspheres containing voids/pores with an average size of 165 nm have an average porosity of 0.8.

The term "bulk sample" means a population of spheres. For example, a bulk sample of microspheres is simply a bulk population of microspheres, for instance ≥0.1 mg, ≥0.2 mg, ≥0.3 mg, ≥0.4 mg, ≥0.5 mg, ≥0.7 mg, ≥1.0 mg, ≥2.5 mg, ≥5.0 mg, ≥10.0 mg or ≥25.0 mg. A bulk sample of spheres may be substantially free of other components. The term "porous spheres" or "porous microspheres" may mean a bulk sample.

The term "of" may mean "comprising", for instance "a liquid dispersion of" may be interpreted as "a liquid dispersion comprising".

The terms "microspheres", "nanospheres", "droplets", etc., referred to herein may mean for example a plurality thereof, a collection thereof, a population thereof, a sample thereof or a bulk sample thereof.

The term "micro" or "micro-scaled" means from about 0.5 μm to about 999 μm. The term "nano" or "nano-scaled" means from about 1 nm to about 999 nm.

The terms "spheres" and "particles" may be interchangeable.

The term "monodisperse" in reference to a population of spheres or spheres means particles having generally uniform shapes and generally uniform diameters. A present monodisperse population of microspheres or nanospheres for instance may have 90%, 91%, 92%, 93%, 94%, 95%, 96%, 97%, 98% or 99% of the particles by number having diameters within ±7%, ±6%, ±5%, ±4%, ±3%, ±2% or ±1% of the average diameter of the population.

Removal of a monodisperse population of polymer spheres provides porous metal oxide spheres having a corresponding population of pores having an average pore diameter.

The term "substantially free of other components" means for example containing ≤5%, ≤4%, ≤3%, ≤2%, <1% or ≤0.5% by weight of other components.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. Numeric values modified by the term "about" include the specific identified value. For example "about 5.0" includes 5.0.

Unless otherwise indicated, all parts and percentages are by weight. Weight percent (wt %), if not otherwise indicated, is based on an entire composition.

A non-limiting set of embodiments of the invention directed towards methods of preparing the porous metal oxide spheres includes:

In a first embodiment, disclosed is a method to prepare porous metal oxide microspheres comprising a metal oxide, the method comprising forming a liquid dispersion of polymer nanoparticles and a metal oxide; forming liquid droplets of the dispersion; drying the liquid droplets to provide polymer template microspheres comprising polymer nanospheres and metal oxide; and removing the polymer nanospheres from the template microspheres to provide the porous metal oxide microspheres.

In a second embodiment, a method according to the first embodiment, comprising forming a liquid dispersion of polymer nanoparticles and the metal oxide, spray-drying the liquid dispersion to provide polymer template microspheres and removing the polymer nanospheres from the template microspheres.

In a third embodiment, a method according to the first embodiment, comprising forming the liquid droplets with a vibrating nozzle. In a fourth embodiment, a method according to embodiments 1 to 3, wherein the liquid droplets are aqueous droplets. In a fifth embodiment, a method according to embodiments 1 to 3, wherein the liquid droplets are oil droplets.

In a sixth embodiment, a method according to embodiment 1, comprising providing a continuous phase and mixing the liquid dispersion with the continuous phase to form an emulsion containing dispersed liquid dispersion droplets. In a seventh embodiment, a method according to embodiment 6, comprising providing a continuous oil phase and mixing an aqueous dispersion with the continuous oil phase to form a water-in-oil emulsion containing aqueous droplets. In an eighth embodiment, a method according to embodiment 6, comprising providing a continuous aqueous phase and mixing an oil dispersion with the continuous phase to form an oil-in-water emulsion containing oil droplets.

In a ninth embodiment, a method according to embodiments 6 to 8, comprising collecting the droplets. In a tenth embodiment, a method according to embodiment 9, comprising drying the droplets to provide polymer template microspheres comprising polymer nanospheres and metal oxide and removing the polymer nanospheres from the template microspheres.

In an eleventh embodiment, a method according to embodiments 6 to 10 wherein drying the droplets comprises microwave irradiation, oven drying, drying under vacuum, drying in the presence of a desiccant, or a combination thereof.

In a twelfth embodiment, a method according to embodiments 7 to 11, wherein the oil phase or dispersion comprises a hydrocarbon, a silicone oil or a fluorinated oil. In a thirteenth embodiment, a method according to embodiments 6 to 12, wherein forming the droplets occurs in a microfluidic device. In a fourteenth embodiment, a method according to embodiments 6 to 13, wherein forming the droplets occurs in a microfluidic device which contains a droplet junction having a channel width of from any of about 10 μm, about 15 μm, about 20 μm, about 25 μm, about 30 μm, about 35 μm, about 40 μm or about 45 μm to any of about 50 μm, about 55 μm, about 60 μm, about 65 μm, about 70 μm, about 75 μm, about 80 μm, about 85 μm, about 90 μm, about 95 μm or about 100 μm. Preferred is a channel width of from 10 μm to 100 μm. In a fifteenth embodiment, a method according to embodiments 13 or 14, comprising collecting the droplets from the microfluidic device.

In a sixteenth embodiment, a method according to any of the preceding embodiments, wherein the wt/wt ratio of polymer nanoparticles to the metal oxide is from any of about 0.1/1, about 0.5/1, about 1.0/1, about 1.5/1, about 2.0/1, about 2.5/1 or about 3.0/1 to any of about 3.5/1, about 4.0/1, about 5.0/1, about 5.5/1, about 6.0/1, about 6.5/1, about 7.0/1, about 8.0/1, about 9.0/1 or about 10.0/1. Preferred is a ratio of 0.1/1 to 10/1.

In a seventeenth embodiment, a method according to any of the preceding embodiments, wherein the polymer nanoparticles have an average diameter of from any of about 50 nm, about 75 nm, about 100 nm, about 130 nm, about 160 nm, about 190 nm, about 210 nm, about 240 nm, about 270 nm, about 300 nm, about 330 nm, about 360 nm, about 390 nm, about 410 nm, about 440 nm, about 470 nm, about 500 nm, about 530 nm, about 560 nm, about 590 nm or about 620 nm to any of about 650 nm, about 680 nm, about 710 nm, about 740 nm, about 770 nm, about 800 nm, about 830 nm, about 860 nm, about 890 nm, about 910 nm, about 940 nm, about 970 nm or about 990 nm.

In an eighteenth embodiment, a method according to any of the preceding embodiments, wherein the polymer is selected from the group consisting of poly(meth)acrylic acid, poly(meth)acrylates, polystyrenes, polyacrylamides, polyethylene, polypropylene, polylactic acid, polyacrylonitrile, derivatives thereof, salts thereof, copolymers thereof and combinations thereof.

In a nineteenth embodiment, a method according to any of the preceding embodiments, wherein the polymer is selected from the group consisting of polystyrenes, for example polystyrene copolymers such as polystyrene/acrylic acid, polystyrene/poly(ethylene glycol) methacrylate or polystyrene/styrene sulfonate. In a twentieth embodiment, a method according to any of the preceding embodiments, wherein the metal oxide is one or more of silica, titania, alumina, zirconia, ceria, iron oxides, zinc oxide, indium oxide, tin oxide or chromium oxide.

In a twenty-first embodiment, a method according to any of the preceding embodiments, wherein the porous microspheres have an average diameter of from about 0.5 μm to about 100 μm, an average porosity of from about 0.10 to about 0.90 or from about 0.10 to about 0.80, and an average pore diameter of from about 50 nm to about 999 nm.

In a twenty-second embodiment, a method according to any of the preceding embodiments, wherein the porous microspheres have an average diameter of from about 1 μm to about 75 μm, from about 2 μm to about 70 μm, from about 3 μm to about 65 μm, from about 4 μm to about 60 μm, from about 5 μm to about 55 μm or from about 5 μm to about 50 μm; for example from any of about 5 μm, about 6 μm, about 7 μm, about 8 μm, about 9 μm, about 10 μm, about 11 μm, about 12 μm, about 13 μm, about 14 μm or about 15 μm to any of about 16 μm, about 17 μm, about 18 μm, about 19 μm, about 20 μm, about 21 μm, about 22 μm, about 23 μm, about 24 μm or about 25 μm.

In a twenty-third embodiment, a method according to any of the preceding embodiments, wherein the porous microspheres have an average porosity of from any of about 0.10, about 0.12, about 0.14, about 0.16, about 0.18, about 0.20, about 0.22, about 0.24, about 0.26, about 0.28, about 0.30, about 0.32, about 0.34, about 0.36, about 0.38, about 0.40, about 0.42, about 0.44, about 0.46, about 0.48 about 0.50, about 0.52, about 0.54, about 0.56, about 0.58 or about 0.60 to any of about 0.62, about 0.64, about 0.66, about 0.68, about 0.70, about 0.72, about 0.74, about 0.76, about 0.78, about 0.80 or about 0.90.

In a twenty-fourth embodiment, a method according to any of the preceding embodiments, wherein the porous microspheres have an average pore diameter of from any of about 50 nm, about 60 nm, about 70 nm, 80 nm, about 100 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm or about 440 nm to any of about 460 nm, about 480 nm, about 500 nm, about 520 nm, about 540 nm, about 560 nm, about 580 nm, about 600 nm, about 620 nm, about 640 nm, about 660 nm, about 680 nm, about 700 nm, about 720 nm, about 740 nm, about 760 nm, about 780 nm or about 800 nm.

In a twenty-fifth embodiment, a method according to any of the preceding embodiments, wherein the porous microspheres have an average diameter of from any of about 4.5 μm, about 4.8 μm, about 5.1 μm, about 5.4 μm, about 5.7 μm, about 6.0 μm, about 6.3 μm, about 6.6 μm, about 6.9 μm, about 7.2 μm or about 7.5 μm to any of about 7.8 μm about 8.1 μm, about 8.4 μm, about 8.7 μm, about 9.0 μm, about 9.3 μm, about 9.6 μm or about 9.9 μm.

In a twenty-sixth embodiment, a method according to any of the preceding embodiments, wherein the porous microspheres have an average porosity of from any of about 0.45, about 0.47, about 0.49, about 0.51, about 0.53, about 0.55 or about 0.57 to any of about 0.59, about 0.61, about 0.63 or about 0.65.

In a twenty-seventh embodiment, a method according to any of the preceding embodiments, wherein the porous microspheres have an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a twenty-eighth embodiment, a method according to any of the preceding embodiments, wherein the porous microspheres have an average diameter of from any of about 4.5 µm, about 4.8 µm, about 5.1 µm, about 5.4 µm, about 5.7 µm, about 6.0 µm, about 6.3 µm, about 6.6 µm, about 6.9 µm, about 7.2 µm or about 7.5 µm to any of about 7.8 µm about 8.1 µm, about 8.4 µm, about 8.7 µm, about 9.0 µm, about 9.3 µm, about 9.6 µm or about 9.9 µm; an average porosity of from any of about 0.45, about 0.47, about 0.49, about 0.51, about 0.53, about 0.55 or about 0.57 to any of about 0.59, about 0.61, about 0.63 or about 0.65; and an average pore diameter of from any of about 220 nm, about 225 nm, about 230 nm, about 235 nm, about 240 nm, about 245 nm or about 250 nm to any of about 255 nm, about 260 nm, about 265 nm, about 270 nm, about 275 nm, about 280 nm, about 285 nm, about 290 nm, about 295 nm or about 300 nm.

In a twenty-ninth embodiment, a method according to any of the preceding embodiments, wherein the porous microspheres comprise from any of about 60.0 wt % to about 99.9 wt % metal oxide, for example comprising from any of about 60.0 wt %, about 64.0 wt %, about 67.0 wt %, about 70.0 wt %, about 73.0 wt %, about 76.0 wt %, about 79.0 wt %, about 82.0 wt % or about 85.0 wt % to any of about 88.0 wt %, about 91.0 wt %, about 94.0 wt %, about 97.0 wt %, about 98.0 wt %, about 99.0 wt % or about 99.9 wt % metal oxide, based on the total weight of the microspheres.

In a thirtieth embodiment, a method according to any of the preceding embodiments, wherein the porous microspheres comprise from about 0.1 wt % to about 40.0 wt % of one or more light absorbers, for example comprising from any of about 0.1 wt %, about 0.3 wt %, about 0.5 wt %, about 0.7 wt %, about 0.9 wt %, about 1.0 wt %, about 1.5 wt %, about 2.0 wt %, about 2.5 wt %, about 5.0 wt %, about 7.5 wt %, about 10.0 wt %, about 13.0 wt %, about 17.0 wt %, about 20.0 wt % or about 22.0 wt % to any of about 24.0 wt %, about 27.0 wt %, about 29.0 wt %, about 31.0 wt %, about 33.0 wt %, about 35.0 wt %, about 37.0 wt %, about 39.0 wt % or about 40.0 wt % of one or more light absorbers, based on the total weight of the microspheres.

In a thirty-first embodiment, a method according to any of the preceding embodiments, wherein the porous microspheres are monodisperse. In a thirty-second embodiment, a method according to any of the preceding embodiments, wherein the porous metal oxide microspheres are a bulk sample of microspheres.

In a thirty-third embodiment, a method according to any of the preceding embodiments, wherein removing the polymer nanospheres from the template microspheres comprises calcination, pyrolysis or solvent removal.

In a thirty-fourth embodiment, a method according to any of the preceding embodiments, wherein removing the polymer nanospheres comprises calcining the template microspheres at temperatures of from any of about 200° C., about 350° C., about 400° C., 450° C., about 500° C. or about 550° C. to any of about 600° C., about 650° C., about 700° C. or about 1200° C. for a period of from any of about 0.1 h (hour), 1 h, about 1.5 h, about 2.0 h, about 2.5 h, about 3.0 h, about 3.5 h or about 4.0 h to any of about 4.5 h, about 5.0 h, about 5.5 h, about 6.0 h, about 6.5 h, about 7.0 h, about 7.5 h about 8.0 h or about 12 h. Alternatively, the calcining can be at temperatures of at least about 200° C., at least about 500° C., or at least about 1000° C., for a suitable period, e.g., for at least about 0.1 hour, at least about 1 hour, at least about 5 hours or at least about 10 hours.

The porous metal oxide spheres are preferably used in concentrations of from 0.01 wt % to 40.0 wt %, or 0.01 wt % to 20.0 wt %, based on the weight of the shaped artificial polymer article. Other ranges include a concentration of 0.1 wt % to 20.0 wt %, or 0.1 wt % to 10.0 or a concentration of 0.25 wt % to 10.0 wt %, or 0.5 wt % to 10.0 wt %.

The porous metal oxide microspheres may be used in combination with one or more UV absorbers, which UV absorbers are selected from the group consisting of 2-hydroxyphenyltriazines, benzotriazoles, 2-hydroxybenzophenones, oxalanilides, cinnamates and benzoates.

The one or more UV absorbers are preferably used in a concentration of from 0.01 wt % to 40.0 wt %, especially 0.01 wt % to 20.0 wt %, based on the weight of the shaped artificial polymer article. More preferred is a concentration of from 0.1 wt % to 20.0 wt %, especially 0.1 wt % to 10.0 wt %.

Benzotriazoles for the combination with the porous metal oxide microspheres are preferably those of the formula (Ia)

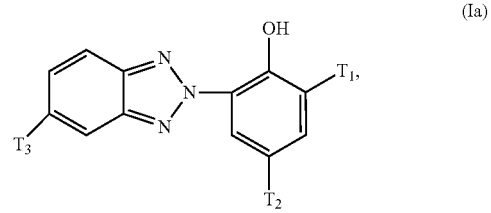

wherein $T_1$ is hydrogen, $C_1$-$C_{18}$alkyl, or $C_1$-$C_{18}$alkyl which is substituted by phenyl, or $T_1$ is a group of the formula

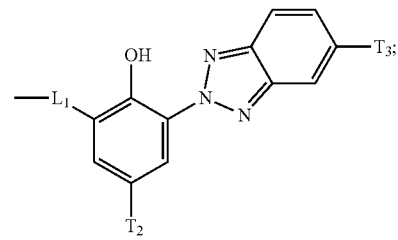

$L_1$ is a divalent group, for example —$(CH_2)_n$—, where n is from the range 1-8;

$T_2$ is hydrogen, $C_1$-$C_{18}$alkyl, or is $C_1$-$C_{18}$alkyl which is substituted by COOT$_5$, $C_1$-$C_{18}$alkoxy, hydroxyl, phenyl or $C_2$-$C_{18}$acyloxy;

$T_3$ is hydrogen, halogen, $C_1$-$C_{18}$alkyl, $C_1$-$C_{18}$alkoxy, $C_2$-$C_{18}$acyloxy, perfluoroalkyl of 1 to 12 carbon atoms such as —$CF_3$, or $T_3$ is phenyl;

$T_5$ is $C_1$-$C_{18}$alkyl or $C_4$-$C_{50}$alkyl interrupted by one or more O and/or substituted by OH or by a group

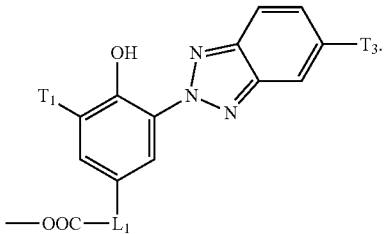

Examples of such benzotriazoles are Tinuvin® PA 328 and Tinuvin® 326 and corresponding UV absorbers given in the list below.

2-Hydroxybenzophenones for the combination with the porous metal oxide microspheres are preferably those of the formula (Ib)

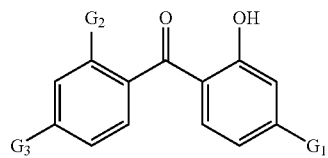

wherein
$G_1$, $G_2$ and $G_3$ independently are hydrogen, hydroxy or $C_1$-$C_{18}$alkoxy.

Examples of such 2-hydroxybenzophenones are Chimassorb® 81 and corresponding UV absorbers given in the list below.

Oxalanilides for the combination with the porous metal oxide microspheres are preferably those of the formula (Ic)

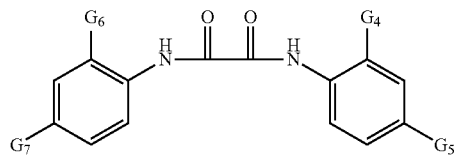

wherein
$G_4$, $G_5$, $G_6$ and $G_7$ independently are hydrogen, $C_1$-$C_{12}$alkyl or $C_1$-$C_{12}$alkoxy.

Examples thereof are corresponding UV absorbers given in the list below.

Cinnamates for the combination with the porous metal oxide microspheres are preferably those of the formula (Id)

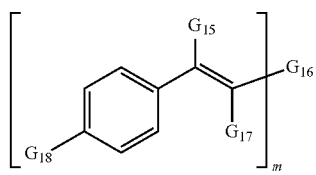

wherein
m is an integer from 1 to 4;
$G_{15}$ is hydrogen or phenyl;
if m is 1, $G_{16}$ is COO-$G_{19}$;
if m is 2, $G_{16}$ is $C_2$-$C_{12}$alkane-dioxycarbonyl;
if m is 3, $G_{16}$ is $C_3$-$C_{12}$alkane-trioxycarbonyl;
if m is 4, $G_{16}$ is $C_4$-$C_{12}$alkane-tetraoxycarbonyl;
$G_{17}$ is hydrogen, CN, or is COO-$G_{19}$;
$G_{18}$ is hydrogen or methoxy; and
$G_{19}$ is $C_1$-$C_{18}$alkyl.

Examples of such cinnamates are Uvinul® 3035 and corresponding UV absorbers given in the list below.

Benzoates for the combination with the porous metal oxide microspheres are preferably those of the formula (Ie)

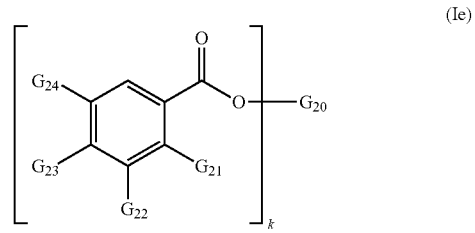

wherein
k is 1 or 2;
when k is 1, $G_{20}$ is $C_1$-$C_{18}$alkyl, phenyl or phenyl substituted by $C_1$-$C_{12}$alkyl, and $G_{21}$ is hydrogen;

when k is 2, $G_{20}$ and $G_{21}$ together are the tetravalent group N PGP-3
$G_{22}$ and $G_{24}$ independently are hydrogen or $C_1$-$C_8$alkyl; and
$G_{23}$ is hydrogen or hydroxy.

Examples of such benzoates are corresponding UV absorbers given in the list below.

2-Hydroxyphenyltriazines for the combination with the porous metal oxide microspheres are preferably those of the formula (If)

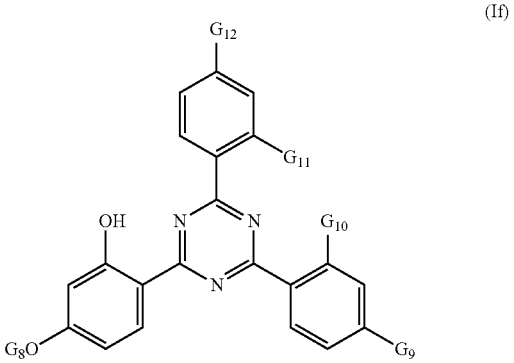

wherein
$G_8$ is $C_1$-$C_{18}$alkyl, or is $C_4$-$C_{18}$alkyl which is interrupted by COO or OCO or O, or is interrupted by O and substituted by OH;

$G_9$, $G_{10}$, $G_{11}$ and $G_{12}$ independently are hydrogen, methyl, hydroxy or $OG_8$;

or of the formula (Ig)

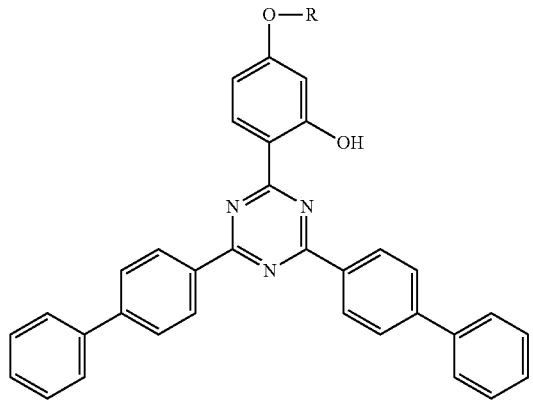

(Ig)

wherein R is $C_1$-$C_{12}$alkyl, $(CH_2$—$CH_2$—$O$—$)_n$-$R_2$; —$CH_2$—$CH(OH)$—$CH_2$—$O$—$R_2$; or —$CH(R_3)$—$CO$—$O$—$R_4$; n is 0 or 1; $R_2$ is $C_1$-$C_{13}$alkyl or $C_2$-$C_{20}$alkenyl or $C_6$-$C_{12}$aryl or $CO$—$C_1$-$C_{18}$alkyl; $R_3$ is H or $C_1$-$C_8$alkyl; and $R_4$ is $C_1$-$C_{12}$alkyl or $C_2$-$C_{12}$alkenyl or $C_5$-$C_6$cycloalkyl.

Examples of such 2-hydroxyphenyltriazines are Tinuvin® 1577 and Tinuvin® 1600 and corresponding UV absorbers given in the list below.

In the context of the definitions given, including $R_2$, $R_3$ or $R_4$, alkyl is, for example, branched or unbranched alkyl such as methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl.

Alkyl interrupted by more than one O is, for example, polyoxyalkylene such as a polyethylene glycol residue.

Aryl is in general an aromatic hydrocarbon radical, for example phenyl, biphenylyl or naphthyl.

Within the context of the definitions indicated alkenyl comprises, inter alia, vinyl, allyl, isopro-penyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-dodec-2-enyl, n-octadec-4-enyl.

Halogen is mainly fluoro, chloro, bromo or iodo, especially chloro.

$C_5$-$C_6$cycloalkyl mainly is cyclopentyl, cyclohexyl.

$C_2$-$C_{13}$acyloxy is, for example, alkanoyloxy, benzoyloxy, or alkenoyloxy such as acryloyloxy or methacryloyloxy.

An example for the divalent $C_2$-$C_{12}$alkane-dioxycarbonyl is —COO—$CH_2CH_2$—OCO—; an example for the trivalent $C_3$-$C_{12}$alkane-trioxycarbonyl is —COO—$CH_2$—CH (OCO—)$CH_2$—OCO—; an example for the tetravalent $C_4$-$C_{12}$alkane-tetraoxycarbonyl is (—COO—$CH_2$)$_4$C.

Preferably, the one or more UV absorbers for the combination with the porous metal oxide microspheres comprise one or more compounds selected from (i) to (lv):

i. 2-(3',5'-di-tert-butyl-2'-hydroxyphenyl)-5-chlorobenzotriazole, ii. 2-(3',5'-di-tert-amyl-2'-hydroxyphenyl)benzotriazole, iii. 2-(3',5'-bis(α,α-dimethylbenzyl)-2'-hydroxyphenyl) benzotriazole, iv. 2-(3'-tert-butyl-2'-hydroxy-5'-(2-octyloxycarbonylethyl)phenyl)benzotriazole, v. 2,2'-methylene-bis[4-(1,1,3,3-tetramethylbutyl)-6-benzotriazole-2-ylphenol], vi. the transesterification product of 2-[3'-tert-butyl-5'-(2-methoxycarbonylethyl)-2'-hydroxyphenyl]-2H-benzotriazole with polyethylene glycol 300, vii. 2-[2'-hydroxy-3'-(α,α-dimethylbenzyl)-5'-(1,1,3,3-tetramethylbutyl)phenyl]benzotriazole, viii. 5-trifluoromethyl-2-(2-hydroxy-3-α-cumyl-5-tert-octylphenyl)-2H-benzotriazole, ix. 2-(2'-hydroxy-5'-(2-hydroxyethyl)phenyl)benzotriazole, x. 2-(2'-hydroxy-5'-(2-methacryloyloxyethyl)phenyl)benzotriazole, xi. 2,4-bis(2,4-dimethylphenyl)-6-(2-hydroxy-4-alkyloxyphenyl)-1,3,5-triazine, where alkyl is a mixture of $C_8$-alkyl groups (CAS Nos. 137759-38-7; 85099-51-0; 85099-50-9);

xii. 2,4-bis(2,4-dimethylphenyl)-6-(2-hydroxy-4-octyloxyphenyl)-1,3,5-triazine (CAS No. 2725-22-6), xiii. 2,4-diphenyl-6-(2-hydroxy-4-[α-ethylhexanoyloxyethyl]phenyl)-1,3,5-triazine, xiv. 2,4-bis(2-hydroxy-4-butyloxyphenyl)-6-(2,4-bis-butyloxyphenyl)-1,3,5-triazine, xv. 2,4,6-tris(2-hydroxy-4-[1-ethoxycarbonylethoxy]phenyl)-1,3,5-triazine, xvi. the reaction product of tris(2,4-dihydroxyphenyl)-1, 3,5-triazine with the mixture of α-chloropropionic esters (made from isomer mixture of $C_7$-$C_{5a}$lcohols), xvii. 2-[4-(dodecyloxy/tridecyloxy-2-hydroxypropoxy)-2-hydroxyphenyl]-4,6-bis(2,4-dimethylphenyl)1,3,5-triazine, xviii. 2-{2-hydroxy-4-[3-(2-ethylhexyl-1-oxy)-2-hydroxypropyloxy]phenyl}-4,6-bis(2,4-dimethylphenyl)-1,3,5-triazine, xix. 2-(2-hydroxy-4-hexyloxyphenyl)-4,6-diphenyl-1,3, 5-triazine, xx. 2-(3'-tert.butyl-5'-methyl-2'-hydroxyphenyl)-5-chloro-benzotriazole, xxi. 2-(3'-sec. butyl-5'-tert.butyl-2'-hydroxyphenyl)-benzotriazole, xxii. 2-(3',5'-di-tert-butyl-2'-hydroxyphenyl)-benzotriazole, xxiii. 2-(5'-tert.octyl-2'-hydroxyphenyl)-benzotriazole, xxiv. 2-(3'-dodecyl-5'-methyl-2'-hydroxyphenyl)-benzotriazole, xxv. 2-(3'-tert.butyl-5'-(2-octyloxycarbonylethyl)-2'-hydroxyphenyl)-5-chloro-benzotriazole, xxvi. 2-(5'-methyl-2'-hydroxyphenyl)-benzotriazole, xxvii. 2-(5'-tert.butyl-2'-hydroxyphenyl)-benzotriazole, the compound of formula

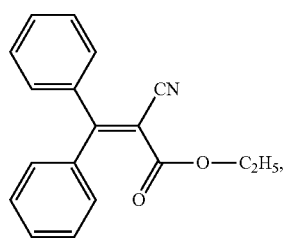 [SMILES: CCOC(=O)C(C#N)=C(c1ccccc1)c1ccccc1]

xxxi. the compound of formula

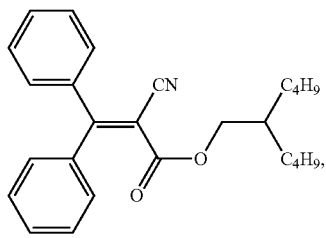

xxxii. 2-ethylhexyl-p-methoxycinnamate (CAS No. 5466-77-3),
xxxiii. 2,4-dihydroxybenzophenone,
xxxiv. 2-hydroxy-4-methoxybenzophenone,
xxxv. 2-hydroxy-4-dodecyloxybenzophenone,
xxxvi. 2-hydroxy-4-octyloxybenzophenone,
xxxvii. 2,2'-dihydroxy-4-methoxybenzophenone,
xxxviii. the compound of formula

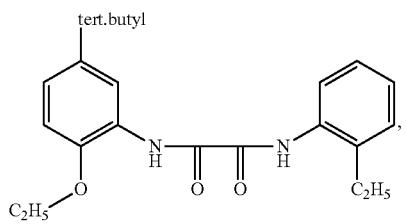

xxxix. the compound of formula

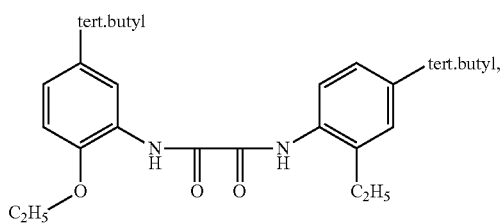

xl. the compound of formula

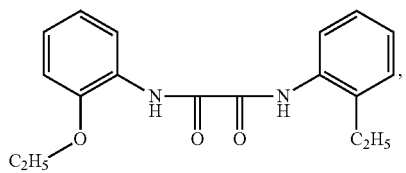

xli. the compound of formula

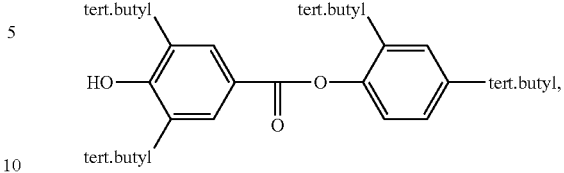

xlii. the compound of formula

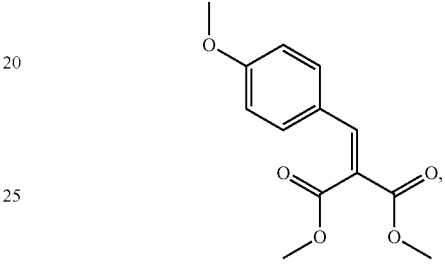

xliii. the compound of formula

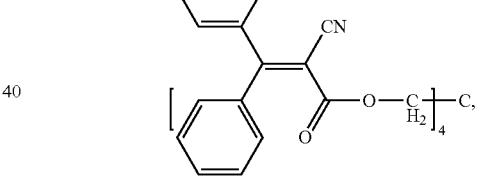

xliv. the compound of formula

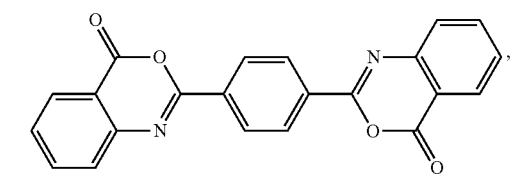 [SMILES: O=c1oc(-c2ccc(-c3nc4ccccc4c(=O)o3)cc2)nc2ccccc12]

xlv. the compound of formula

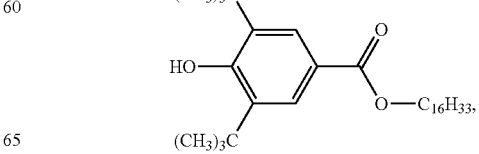

xlvi.
xlvi. the compound of formula
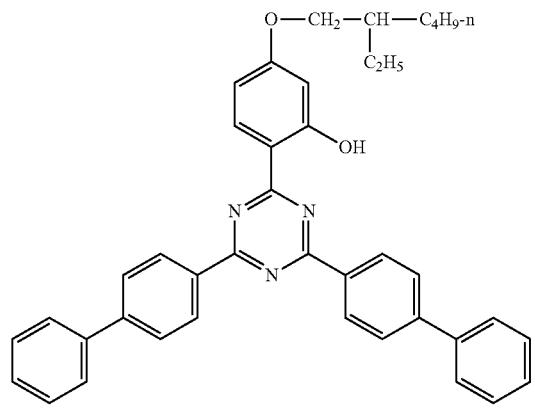
xlix. the compound of formula
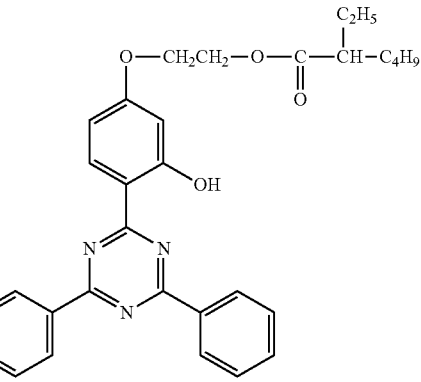
l. the compound of formula
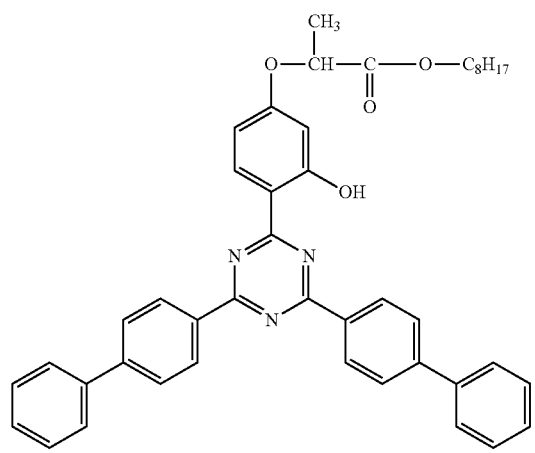
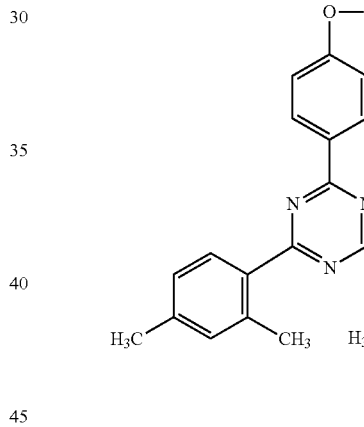
xlvii. the compound of formula
xlviii. the compound of formula
li. the compound of formula
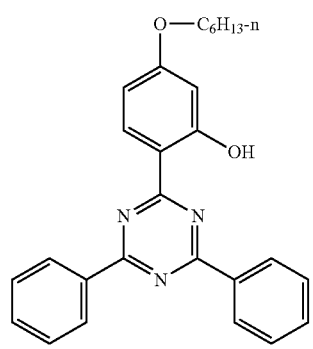
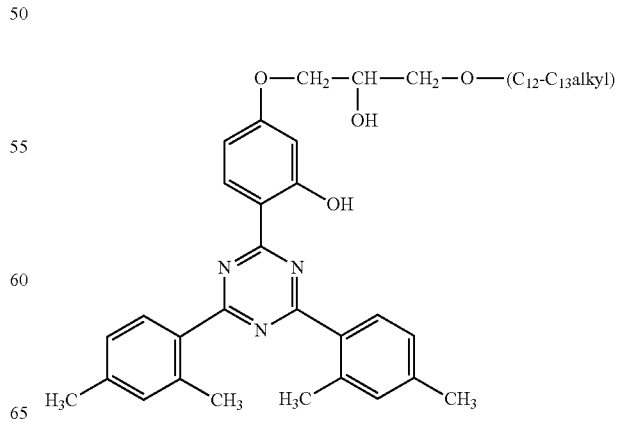

lii. the compound of formula
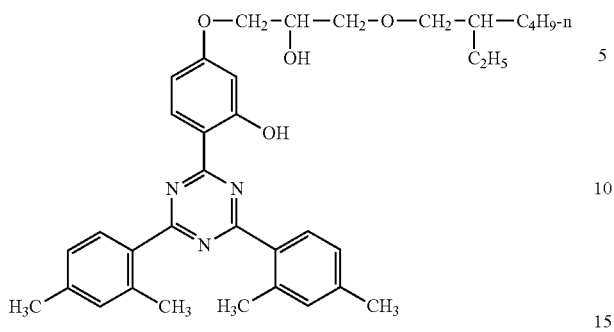
liii. the compound of formula
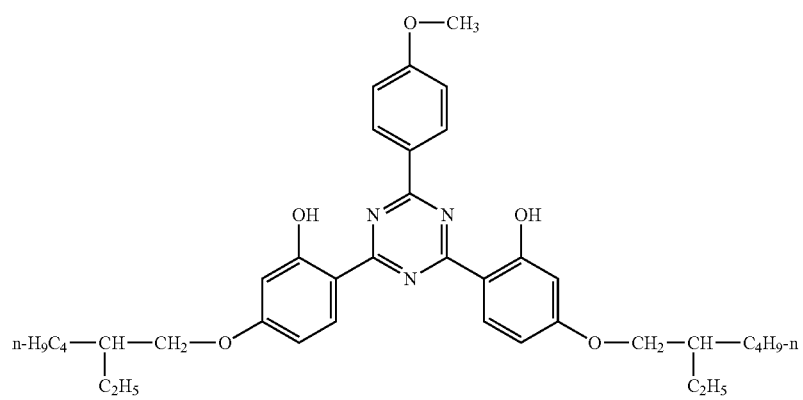
liv. the compound of formula
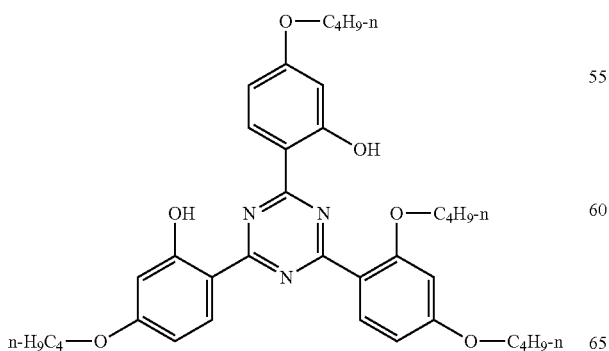

lv. the compound of formula

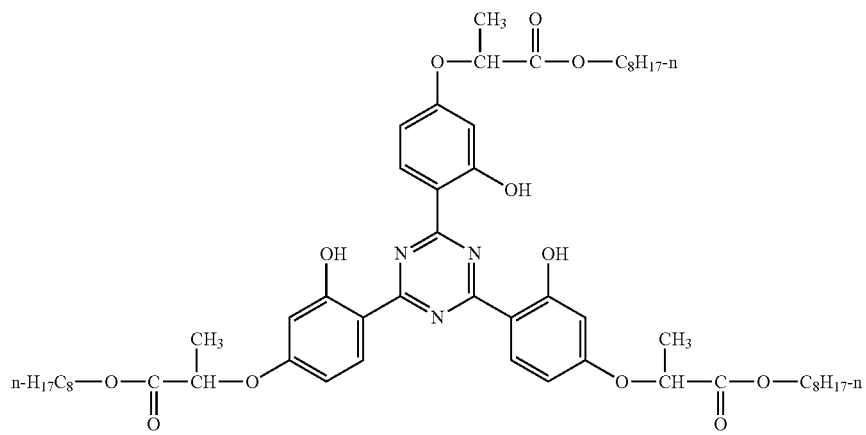

lvi. Dodecanedioic acid, 1,12-bis[2-[4-(4,6-diphenyl-1,3,5-triazin-2-yl)-3-hydroxyphenoxy]ethyl]ester (CAS No. 1482217-03-7)

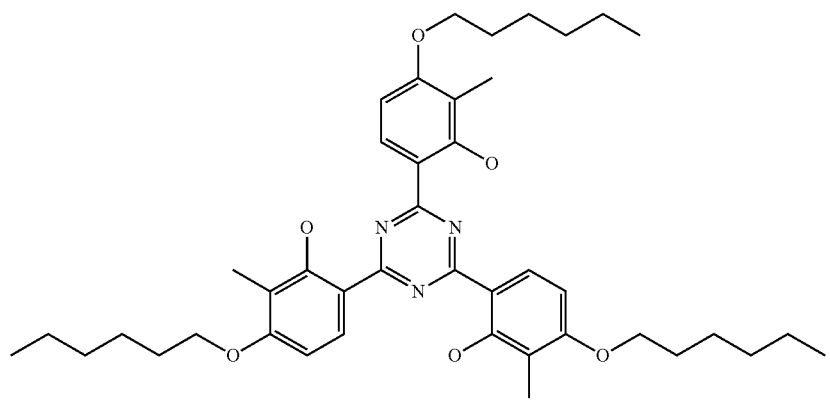 [SMILES: CCCCCCOc1ccc(-c2nc(-c3ccc(OCCCCCC)c(C)c3O)nc(-c3ccc(OCCCCCC)c(C)c3O)n2)c(O)c1C]

lvii. the compound of formula

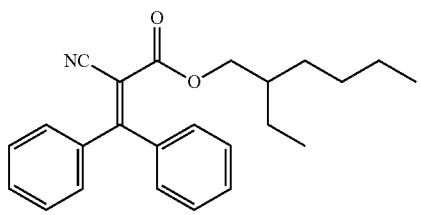 [SMILES: CCCCC(CC)COC(=O)C(C#N)=C(c1ccccc1)c1ccccc1]

lviii. the compound of formula

In one embodiment, the UV absorbers i-xx and xlvi are preferred.

In a specific embodiment, UV absorbers i-iv, vi-xi, xiii-xviii, xx, xxiii-xxxix, xlvi; especially ii, iii, iv, vi, vii, viii, xx, xxv, xxxvii, xlvi are preferred.

In a further embodiment i-x, xii, xiii, xix-xxiii, xxv-xxvii, xxx-xxxvi, xl-xlv and xlvi; especially i, ii, iii, v, vi, viii, xii, xiii, xix, xx, xxii, xxiii, xxvi, xxx, xxxi, xxxiv, xxxvi, xl, xli, xlii, xliii, xliv, xlv, xlvi are preferred.

Highly preferred as 2-hydroxyphenyltriazines are xii, xlviii and xlvi.

Preferred are 2-hydroxyphenyltriazines, benzotriazoles, 2-hydroxybenzophenones and benzoates, especially 2-hydroxyphenyltriazines, benzotriazoles and 2-hydroxybenzophenones. More preferred are benzotriazoles and 2-hydroxybenzophenones, especially benzotriazoles.

Specific examples of a synthetic polymer or a natural or synthetic elastomer for the shaped artificial polymer articles are:

1. Polymers of monoolefins and diolefins, for example polypropylene, polyisobutylene, polybut-1-ene, poly-4-methylpent-1-ene, polyvinylcyclohexane, polyisoprene or poly-butadiene, polyhexene, polyoctene, as well as polymers of cycloolefins, for instance of cyclopentene, cyclohexene, cyclooctene or nor-bornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups la, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single-site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), very low density polyethylene, propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random poly-alkylene/carbon monoxide copolymers and mixtures thereof with other polymers, for example polyamides.

4. Hydrocarbon resins (for example C5-C9) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included. Copolymers from 1.)-4.) may by random or block-copolymers, homo- or heterophasic, or High Crystalline Homopolymer.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/isoprene/butadiene/styrene, styrene/ethylene/butylene/styrene or styrene/ethylene/propylene/styrene, HIPS, ABS, ASA, AES.

6b. Hydrogenated aromatic polymers derived from hydrogenation of polymers mentioned under 6.), especially including polycyclohexylethylene (PCHE) prepared by hydrogenating atactic polystyrene, often referred to as poly-vinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers. Polyvinyl chloride may be rigid or flexible (plasticized).

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or poly-butadienes on the one hand and aliphatic or aromatic polyisocyanates on the other, as well as precursors thereof. Polyurethanes formed by the reaction of: (1) diisocyanates with short-chain diols (chain extenders) and (2) diisocyanates with long-chain diols (thermoplastic polyurethanes, TPU).

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems). The poylamides may be amorphous.

17. Polyureas, polyimides, polyamideimides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polypropylene terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutyl-enesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly (hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate, polyethylene furanoate and polylactic acid (PLA) as well as corresponding polyesters modified with polycarbonates or MBS. The term "polylactic acid (PLA)" designates a homopolymer of preferably poly-L-lactide and any of its blends or alloys with other polymers; a copolymer of lactic acid or lactide with other monomers, such as hydroxy-carboxylic acids, like for example glycolic acid, 3-hydroxy-butyric acid, 4-hydroxybutyric acid, 4-hydroxy-valeric acid, 5-hydroxy-valeric acid, 6-hydroxy-caproic acid and cyclic forms thereof; the terms "lactic acid" or "lactide" include L-lactic acid, D-lactic acid, mixtures and di-mers thereof, i.e. L-lactide, D-lactide, meso-lacide and any mixtures thereof. Preferred polyesters are PET, PET-G, PBT.

19. Polycarbonates and polyester carbonates. The polycarbonates are preferably prepared by reaction of bisphenol compounds with carbonic acid compounds, in particular phosgene or, in the melt transesterification process, diphenyl carbonate or dimethyl carbonate. Homopolycarbonates based on bisphenol A and copolycarbonates based on the monomers bisphenol A and 1,1-bis-(4-hydroxyphenyl)-3,3,5-trimethylcyclohexane (bisphenol TMC) are particularly preferred. These and further bisphenol and diol compounds which can be used for the polycarbonate synthesis are disclosed inter alia in WO08037364 (p. 7, line 21 to p.10, line 5), EP1582549 ([0018] to [0034]), WO02026862 (p.2, line 23 to p. 5, line 15), WO05113639 (p. 2, line 1 to p.7, line 20). The polycarbonates can be linear or branched. Mixtures of branched and unbranched polycarbonates can also be used. Suitable branching agents for polycarbonates are known from the literature and are described, for example, in patent specifications U.S. Pat. No. 4,185,009 and DE2500092 (3,3-bis-(4-hydroxyaryloxindoles according to the invention, see whole document in each case), DE4240313 (see p.3, line 33 to 55), DE19943642 (see p.5, line 25 to 34) and U.S. Pat. No. 5,367,044 as well as in literature cited therein. The polycarbonates used can additionally be intrinsically branched, no branching agent being added here within the context of the polycarbonate preparation. An example of intrinsic branchings are so-called Fries structures, as are disclosed for melt polycarbonates in EP1506249. Chain terminators can additionally be used in the polycarbonate preparation. Phenols such as phenol, alkylphenols such as cresol and 4-tert-butylphenol, chlorophenol, bromophenol, cumylphenol or mixtures thereof are preferably used as chain terminators. Polyester carbonates are obtained by reaction of the bi-sphenols already mentioned, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenonedicarboxylic acids. A portion, up to 80 mol-%, preferably from 20 to 50 mol-%, of the carbonate groups in the polycarbonates can be replaced by aromatic dicarboxylic acid ester groups.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A, bisphenol E and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and co-polymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

32. Adhesives, for example block copolymers such as SIS, SBS, SEBS, SEPS (S represents styrene, I isoprene, B polybutadiene, EB ethylene/butylene block, EP polyethylene/polypropylene block).

33. Rubbers, for example polymers of conjugated dienes, e.g. polybutadiene or polyisoprene, copolymers of mono- and diolefins with one another or with other vinyl monomers, copolymers of styrene or α-methylstyrene with dienes or with acrylic derivatives, chlorinated rubbers, natural rubber.

34. Elastomers, for example Natural polyisoprene (cis-1, 4-polyisoprene natural rubber (NR) and trans-1,4-polyisoprene gutta-percha), Synthetic polyisoprene (IR for isoprene rubber), Polybutadiene (BR for butadiene rubber), Chloroprene rubber (CR), polychloroprene, Neoprene, Baypren etc., Butyl rubber (copolymer of isobutylene and isoprene, IIR), Halogenated butyl rubbers (chloro butyl rubber: CIIR; bromo butyl rubber: BIIR), Styrene-butadiene Rubber (copolymer of styrene and butadiene, SBR), Nitrile rubber (copolymer of butadiene and acrylonitrile, NBR), also called Buna N rubbers Hydrogenated Nitrile Rubbers (HNBR) Therban and Zetpol, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA), Thermoplastic elastomers (TPE), The proteins resilin and elastin, Polysulfide rubber, Elastolefin, elastic fiber used in fabric production.

35. Thermoplastic elastomers, for example Styrenic block copolymers (TPE-s), Thermoplastic olefins (TPE-o), Elastomeric alloys (TPE-v or TPV), Thermoplastic polyurethanes (TPU), Thermoplastic copolyester, Thermoplastic polyamides, Reactor TPO's (R-TPO's), Polyolefin Plastomers (POP's), Polyolefin Elastomers (POE's).

Most preferred are thermoplastic polymers, like polyolefins and copolymers thereof.

The shaped artificial polymer article of the present invention is for example prepared by one of the following processing steps:

Injection blow molding, extrusion, blow molding, rotomolding, in mold decoration (back injection), slush molding, injection molding, co-injection molding, blow molding, forming, compression molding, resin transfer molding, pressing, film extrusion (cast film; blown film), fiber spinning (woven, non-woven), drawing (uniaxial, biaxial), annealing, deep drawing, calandering, mechanical transformation, sintering, coextrusion, lamination, crosslinking (radiation, peroxide, silane), vapor deposition, weld together, glue, vulcanization, thermoforming, pipe extrusion, profile extrusion, sheet extrusion; sheet casting, strapping, foaming, recycling/rework, visbreaking (peroxide, thermal), fiber melt blown, spun bonded, surface treatment (corona discharge, flame, plasma), sterilization (by gamma rays, electron beams), tape extrusion, pulltrusion, SMC-process or plastisol.

A further embodiment of the present invention are shaped artificial polymer articles wherein the polymer is a synthetic polymer and/or a natural or synthetic elastomer and wherein the polymer contains porous metal oxide microspheres as defined herein. As to such articles the definitions and preferences given herein shall apply.

It is preferred that the shaped artificial polymer article is an extruded, casted, spun, molded or calendered shaped artificial polymer article.

Examples of articles according to the present invention are:

I-1) Floating devices, marine applications, pontoons, buoys, plastic lumber for decks, piers, boats, kayaks, oars, and beach reinforcements.

I-2) Automotive applications, interior applications, exterior applications, in particular trims, bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof, door medallion, consoles, instrument panels, seats, frames, skins, automotive applications reinforced, automotive applications fiber reinforced, automotive applications with filled polymers, automotive applications with unfilled polymers.

I-3) Road traffic devices, in particular sign postings, posts for road marking, car accessories, warning triangles, medical cases, helmets, tires.

I-4) Devices for transportation or public transportation. Devices for plane, railway, motor car (car, motorbike), trucks, light trucks, busses, trams, bikes including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, closets, wardrobes, dividing walls, slat walls, folding walls, roofs, shutters (e.g. roller shutters), fittings, connections between pipes, sleeves, and conveyor belts.

III-3) Sanitary articles, in particular mobile toilets, shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes), cladding and siding.

III-7) Glass substitutes, in particular extruded plates, glazing for buildings (monolithic, twin or multiwall), aircraft, schools, extruded sheets, window film for architectural glazing, train, transportation and sanitary articles.

III-8) Plates (walls, cutting board), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotex-tiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, geomembranes, tunnels, dumps, ponds, walls roofing membranes, geomembranes, swimming pools, swimming pool liners, pool liners, pond liners, curtains (shades)/sun-shields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V-1) Films (packaging, rigid packaging, dump, laminating, bale wrap, swimming pools, waste bags, wallpaper, stretch film, raffia, desalination film, batteries, and connectors.

V-2) Agricultural films (greenhouse covers, tunnel, multi-tunnel, micro-tunnel, "raspa y amagado", multi-span, low walk-in tunnel, high tunnel, mulch, silage, silo-bags, silo-stretch, fumigation, air bubble, keder, solawrap, thermal, bale wrap, stretched bale wraps, nursery, film tubes), especially in presence of intensive application of agrochemicals; other agricultural applications (e.g. non-woven soil covers, nets (made of tapes, multi-filaments and conbinations thereof), tarpaulins. Such an agricultural film can either be a mono-layer structure or a multi-layer structure, typically made of three, five or seven layers. This can lead to a film structure like A-B-A, A-B-C, A-B-C-B-A, A-B-C-B-D, A-B-C-D-C-B-A, A-A-B-C-B-A-A. A, B, C, D represent the different polymers and tackifiers. However adjacent layers can also be coupled so that the final film article can be made of an even number of layers, i.e. two, four or six layers such as A-A-B-A, A-A-B-B, A-A-B-A-A, A-B-B-A-A, A-A-B-C-B, A-A-B-C-A-A and the like.

V-3) Tapes

V-4) Foams (sealing, insulation, barrier), sport and leisure mats.

V-5) Sealants

VI-1) Food packing and wrapping (flexible and solid), BOPP, BOPET, bottles.

VI-2) Storage systems such as boxes (crates), luggage, chest, household boxes, pallets, container, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, TiO2, mica, nanocomposites, dolomite, silicates, glass, asbestos).

A shaped artificial polymer article which is a film, pipe, cable, tape, sheet, container, frame, fibre or monofilament is preferred.

Another preferred embodiment of the present invention is a thin film, typically obtained with the blow extrusion technology. A monolayer film or a multilayer film of three, five or seven layers is of particular interest. The most important application of thin plastic films in agriculture is as covers for greenhouses and tunnels to grow crops in a protected environment.

A further embodiment of the present invention is an extruded, casted, spun, molded or calendered polymer composition comprising a synthetic polymer and/or a natural or synthetic elastomer and the porous metal oxide microspheres as defined herein. As to such compositions the definitions and preferences given herein shall apply.

The porous metal oxide spheres are preferably present in the extruded, casted, spun, molded or calendered polymer composition in an amount of from 0.01 wt % to 40.0 wt %, especially 0.01 wt % to 20.0 wt %, based on the weight of the composition. More preferred is a concentration of 0.1 wt % to 20.0 wt %, especially 0.1 wt % to 10.0. Highly preferred is a concentration of 0.25 wt % to 10.0 wt %, especially 0.5 wt % to 10.0 wt %.

The extruded, casted, spun, molded or calendered polymer composition and the shaped artificial polymer article may comprise at least one further additive in an amount of from 0.001% to 30%, preferably 0.005% to 20%, in particular 0.005% to 10%, by weight, relative to the weight of the extruded, casted, spun, molded or calendered polymer composition or the article. Examples are listed below:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, 6-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hy-droxybenzyl)malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetrame-thylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4- tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hy-droxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N-dimethyl-N,N-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-meth-oxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylben-zoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine,

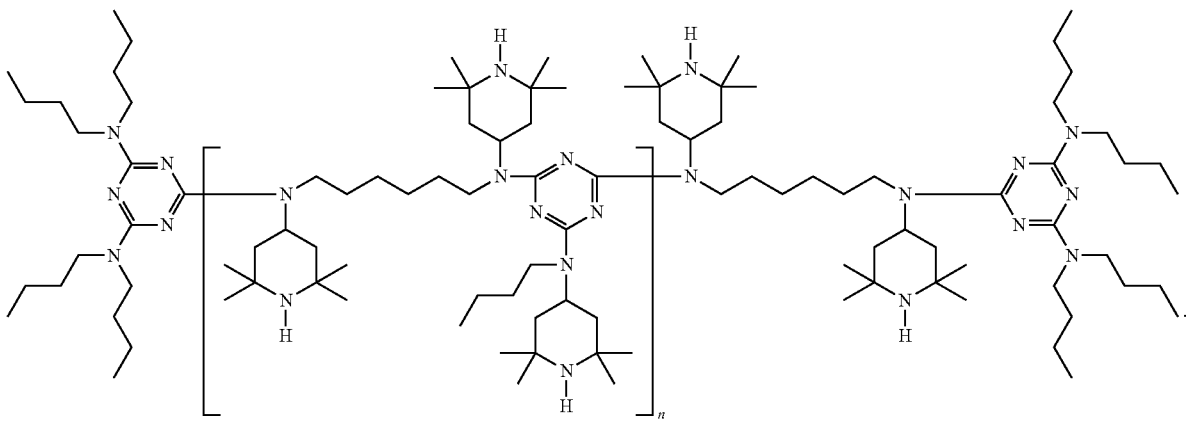

(Chimassorb®2020)

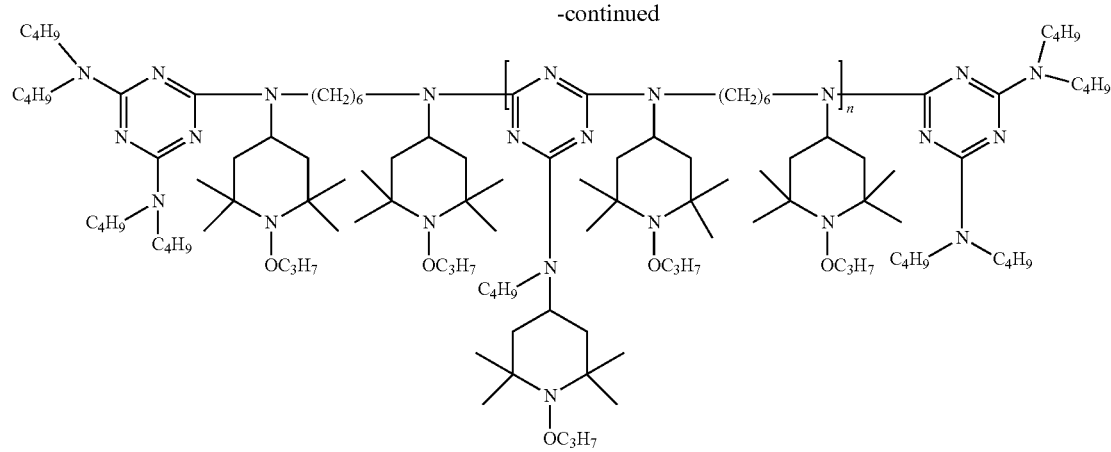

(Tinuvin®NOR 371)

1,3,5-Triazine-2,4,6-triamine, N,N'''-1,6-hexanediylbis[N',N''-dibutyl-N,N',N''-tris(2,2,6,6-tetramethyl-4-piperidinyl)-reaction products with 3-bromo-1-propene, oxidized, hydrogenated, 1,3,5-Triazine-2,4,6-triamine, N,N'''-1,6-hexanediylbis[N',N''-dibutyl-N,N',N''-tris(2,2,6,6-tetramethyl-4-piperidinyl)-, 4-Piperidinol, 2,2,6,6-tetramethyl-1-(undecyloxy)-, 4,4'-carbonate, 1,3,5-Triazine-2,4,6-triamine, N2,N2'-1,6-hexanediylbis[N4,N6-dibutyl-N2,N4,N6-tris(2,2,6,6-tetramethyl-4-piperidinyl)-, N-allyl derives, oxidized, hydrogenated and combinations thereof.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2-(4,6-bis-biphenyl-4-yl-1,3,5-triazin-2-yl)-5-(2-ethyl-(n)-hexyloxy)phenol; dodecanedioic acid, 1,12-bis[2-[4-(4,6-diphenyl-1,3,5-triazin-2-yl)-3-hydroxyphenoxy]ethyl] ester (CAS No. 1482217-03-7).

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyl-oyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-di-methylpropyl)phenyl triesters (CAS No. 939402-02-5), Phosphorous acid, triphenyl ester, polymer with alpha-hydro-omega-hydroxypoly[oxy(methyl-1,2-ethanediyl)], C10-16 alkyl esters (CAS No. 1227937-46-3).

The following phosphites are especially preferred:

Tris(2,4-di-tert-butylphenyl) phosphite (Irgafos®168, Ciba Specialty Chemicals Inc.), tris(nonylphenyl) phosphite, (A) 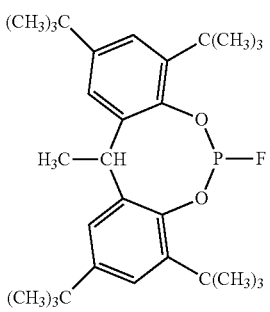

(B) 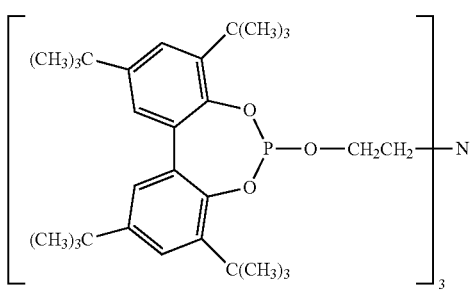

(C) 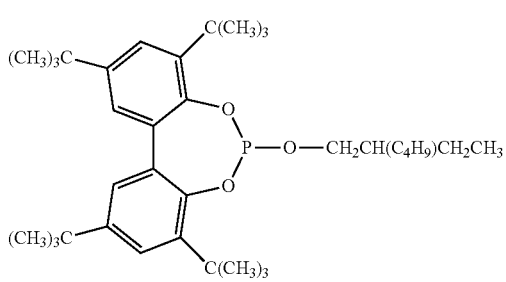

(D) 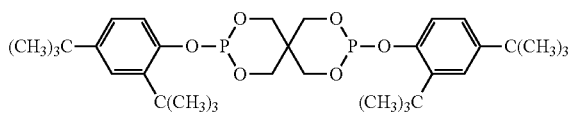

(E) 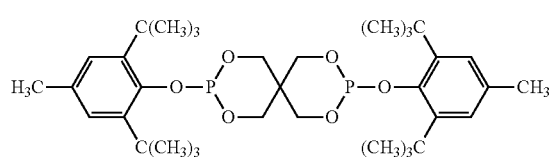

(F) 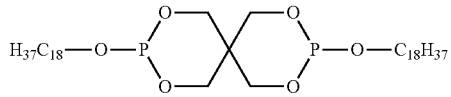

(G) 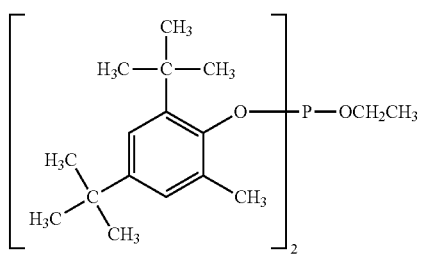

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate, pentaerythritol tetrakis[3-(dodecylthio)propionate] or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(p-dodecylmercapto)propionate.

9. Polyamide stabilizers, for example copper salts in combination with iodides and/or phos-phorus compounds and salts of divalent manganese.

10. Basic co-stabilizers, for example melamine, polyvinylpyrrolidone, dicyandiamide, triallyl cy-anurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. PVC heat stabilizer, for example, mixed metal stabilizers (such as Barium/Zinc, Calcium/Zinc type), Organotin stabilizers (such as organo tin mercaptester, -carboxylate, -sulfide), Lead stabilizers (such as Tribasic lead sulfate, Dibasic lead stearate, Dibasic lead phthalate, Dibasic lead phosphate, lead stearate), organic based stabilizers and combinations thereof.

12. Nucleatinq aqents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

13. Fillers and reinforcinq aqents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

14. Plasticizer, wherein said plasticizer is selected from the group consisting of Di(2-ethylhexyl) phthalate, Disononyl phthalate, Diisodecyl phthalate, Dipropylheptyl phthalate, Trioctyl trimellitate, Tri(isononyl) trimellitate, epoxidized soy bean oil, Di(isononyl) cyclohexane-1,2-dicarboxcylate, 2,4,4-Trimethyl-1,3-pentaediol diisobutyrate.

The plasticizer as used in accordance with the invention may also comprise one selected from the group consisting of: phthalates, trimellitates, aliphatic dibasic esters, polyesters, polymeric, epoxides, phosphates. In a preferred embodiment said plasticizer is selected from the group consisting of: Butyl benzyl phthalate, Butyl 2-ethylhexyl phthalate, Diisohexyl phthalate, Diisoheptyl phthalate, Di(2-ethylhexyl) phthalate, Diisooctyl phthalate, Di-n-octyl phthalate, Disononyl phthalate, Diisodecyl phthalate, Diiso undecyl phthalate, Diisotredecyl phthalate, Diiso (C11, C12, C13) phthalate, Di(n-butyl) phthalate, Di(n-C7, C9) phthalate, Di(n-C6, C8, C10) phthalate, Diiso(n-nonyl) phthalate, Di(n-C7, C9, C11) phthalate, Di(n-C9, C11) phthalate, Di(n-undecyl) phthalate, Tri(n-C8, C10) trimellitate, Tri(2-ethylhexyl) trimellitate, Tri(isooctyl) trimellitate, Tri(isononyl) trimellitate, Di(n-C7, C9) adipate, Di(2-ethylhexyl) adipate, Di(isooctyl) adipate, Di(isononyl) adipate, Polyesters of adipinic acid or glutaric acid and propylene glycol or butylene glycol or 2,2-dimethyl-1,3-propanediol, Epoxidized oils such as epoxidized soy bean oil, epoxidized linseed oil, epoxidized tall oil, Octyl epoxy tallate, 2-ethylhexyl epoxy tallate, Isodecyl diphenyl phosphate, Tri(2-ethylhexyl) phosphate, Tricresyl phosphate, Di(2-ethylhexyl) terephthalate, Di(isononyl) cyclohexane-1,2-dicarboxcylate and combinations thereof. In a particularly preferred embodiment said plasticizer is selected from the group consisting of: Diisohexyl phthalate, Diisoheptyl phthalate, Di(2-ethylhexyl) phthalate, Diisooctyl phthalate, Di-n-octyl phthalate, Disononyl phthalate, Diisodecyl phthalate, Diiso undecyl phthalate, Diisotredecyl phthalate, Diiso (C11, C12, C13) phthalate, Di(n-butyl) phthalate, Di(n-C7, C9) phthalate, Di(n-C6, C8, C10) phthalate, Diiso (n-nonyl) phthalate, Di(n-C7, C9, C11) phthalate, Di(n-C9, C11) phthalate, Di(n-undecyl) phthalate, Tri(n-C8, C10) trimellitate, Tri(2-ethylhexyl) trimellitate, Tri(isooctyl) trimellitate, Tri(isononyl) trimellitate, Di(n-C7, C9) adipate, Di(2-ethylhexyl) adipate, Di(isooctyl) adipate, Di(isononyl) adipate, Polyesters of adipinic acid or glutaric acid and propylene glycol or butylene glycol or 2,2-dimethyl-1,3-propanediol, Epoxidized oils such as epoxidized soy bean oil, Di(isononyl) cyclohexane-1,2-dicarboxcylate and combinations thereof.

15. Other additives, for example plasticisers, lubricants, emulsifiers, pigments, rheology additives, catalysts, flow-control agents, optical brighteners, flameproofing agents, antistatic agents and blowing agents.

16. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxy-ethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-di-methylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

In certain embodiments, the photonic material disclosed herein with UV absorption functionality can be coated on or incorporated into a substrate, e.g., plastics, wood, fibers or fabrics, ceramics, glass, metals and composite products thereof The scope and interest of the invention will be better understood based on the following examples which are intended to illustrate certain embodiments of the invention and are non-limitative.

EXAMPLES

UV measurements for Application Examples 1 to 19 are carried out as follows: The ultraviolet transmission spectrum was measured using a Varian 5000 UV-Vis-NIR Dual Beam Spectrophotometer. The plaques to be measured were placed in the sample holder and the transmitted light was measured by photodetector in 1 nm increments between 200 and 800 nm. The reference beam was not used. The 0% transmission reference was determined by blocking the measurement beam to the photodetector. The 100% transmission reference was determined by allowing the beam to reach the photodetector unobstructed.

Synthesis Example 1: Porous Silica Microspheres

A styrene/acrylic acid copolymer is prepared as follows: 230 mL deionized (DI) water is added to a 3-neck reaction flask equipped with a thermometer, condenser, magnetic stirring and nitrogen atmosphere. The water is heated to 80° C. and 10 g of styrene are added with stirring, followed by 100 mg acrylic acid dissolved in 10 mL DI water via syringe. 100 mg of ammonium persulfate is dissolved in 10 mL DI water and added to the stirred mixture via syringe. The reaction mixture is stirred for 24 hours at 80° C. The polymer colloid dispersion is allowed to cool to room temperature and is purified via centrifugation, producing polystyrene nanospheres having an average particle size of 250 nm.

The aqueous polystyrene colloid dispersion is diluted to 1 wt % with deionized water and 1 wt % silica nanoparticles are added and the mixture is sonicated to prevent particle agglomeration. A continuous oil phase contains 0.1 wt % polyethylene glycol/perfluoropolyether surfactant in a fluorinated oil. The aqueous colloid dispersion and oil are each injected into a microfluidic device having a 50 μm droplet junction via syringes associated with pumps. The system is allowed to equilibrate until monodisperse droplets are produced. The monodisperse droplets are collected in a reservoir.

Collected droplets are dried in an oven at 45° C. for 4 hours to provide monodisperse polymer template microspheres. The polymer template microspheres are calcined by placing on a silicon wafer, heating from room temperature to 500° C. over a 3 hour period, holding at 500° C. for 2 hours, and cooling back to room temperature over a 3 hour period. Provided are monodisperse silica microspheres having an average diameter of 15 microns.

Figure 2:
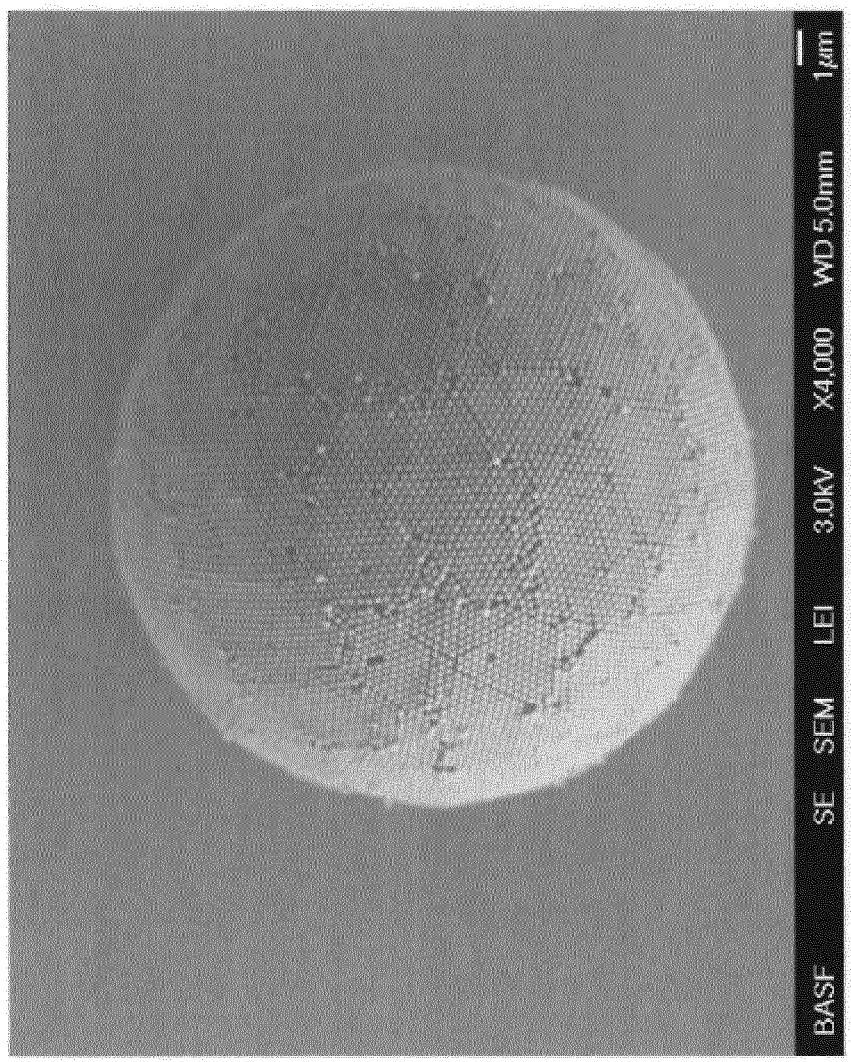
FIG. 2 is a scanning electron microscope (SEM) image of a polymer template microsphere, according to an embodiment of the invention.
Figure 3:
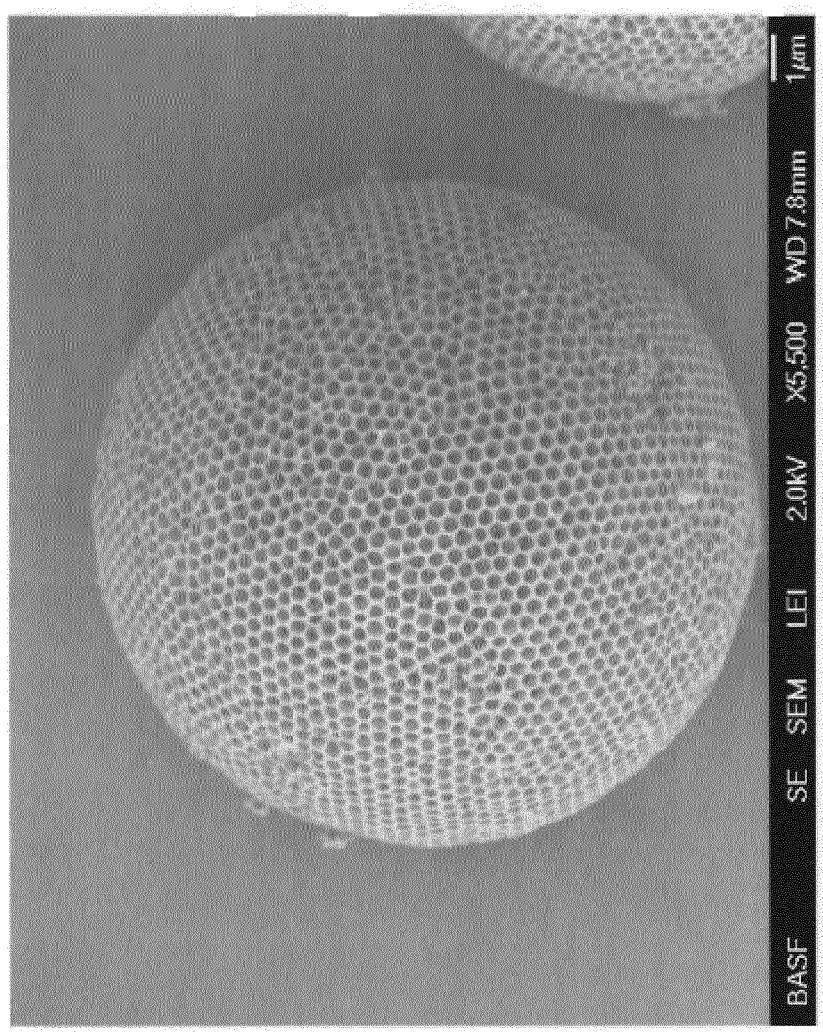
FIG. 3 is a SEM image of a porous silica microsphere, according to an embodiment of the invention.

FIG. 2 and FIG. 3 are scanning electron microscope (SEM) images of a polymer template microsphere and a porous silica microsphere prepared in a similar fashion.

Synthesis Example 2: Drying Method

Example 1 is repeated, wherein the drying step employs microwave irradiation, drying under vacuum and/or drying in the presence of a desiccant.

Synthesis Example 3: Preparation of Porous Silica Microspheres via Spray-Drying

A styrene/acrylic acid copolymer is prepared as follows: 230 mL deionized (DI) water is added to a 3-neck reaction flask equipped with a thermometer, condenser, magnetic stirring and nitrogen atmosphere. The water is heated to 80° C. and 10 g of styrene are added with stirring, followed by 100 mg acrylic acid dissolved in 10 mL DI water via syringe.

100 mg of ammonium persulfate is dissolved in 10 mL DI water and added to the stirred mixture via syringe. The reaction mixture is stirred for 24 hours at 80° C. The polymer colloid dispersion is allowed to cool to room temperature and is purified via centrifugation, producing polystyrene nanospheres having an average particle size of 250 nm.

The aqueous polystyrene colloid dispersion is diluted to 1 wt % with deionized water and 1 wt % silica nanoparticles are added and the mixture is sonicated to prevent particle agglomeration. The aqueous dispersion is spray-dried to provide polymer template microspheres comprising polymer nanospheres and silica. The microspheres are calcined by heating from room temperature to 500° C. over a 3 hour period, holding at 500° C. for 2 hours, and cooling back to room temperature over a 3 hour period. Provided are porous silica microspheres.

Synthesis Example 4: Zinc Oxide Porous Microspheres

A sample of porous zinc oxide microspheres is prepared according to the procedure of Example 3, replacing silica with zinc oxide and where the polystyrene nanospheres have an average particle size of 230 nm and a wt/wt ratio of polymer to zinc oxide of 1:2. A 0.5 mg sample of porous microspheres are evenly placed in a 10 mL clear glass vial having a 6 cm² bottom surface. The sample exhibits a distinct blue color to the human eye.

Synthesis Example 5: Silica/Titania Porous Microspheres

A sample of porous microspheres containing silica and titania is prepared according to the process of Example 1, wherein the wt/wt ratio of polymer to total metal oxide is 3:1. The wt/wt ratio of silica to titania is 9:1.

Application Examples 1 to 3

Polypropylene powder (Profax 6301, 12 g/10 min melt flow rate) is weighed in a 240 ml cup. An antioxidant (Irganox B 215) and the porous silica microspheres of Synthesis Example 3 are weighed and mixed with the powder. The weights of the components for each sample are listed in Table 1, below.

TABLE 1

Weight and concentration of the components

| Application Example | Polypropylene, g | Antioxidant, g | Porous silica spheres, g |
|---|---|---|---|
| 1 | 49.95 | 0.05 | — |
| 2 | 49.7 | 0.05 | 0.25 |
| 3 | 49.2 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 5:
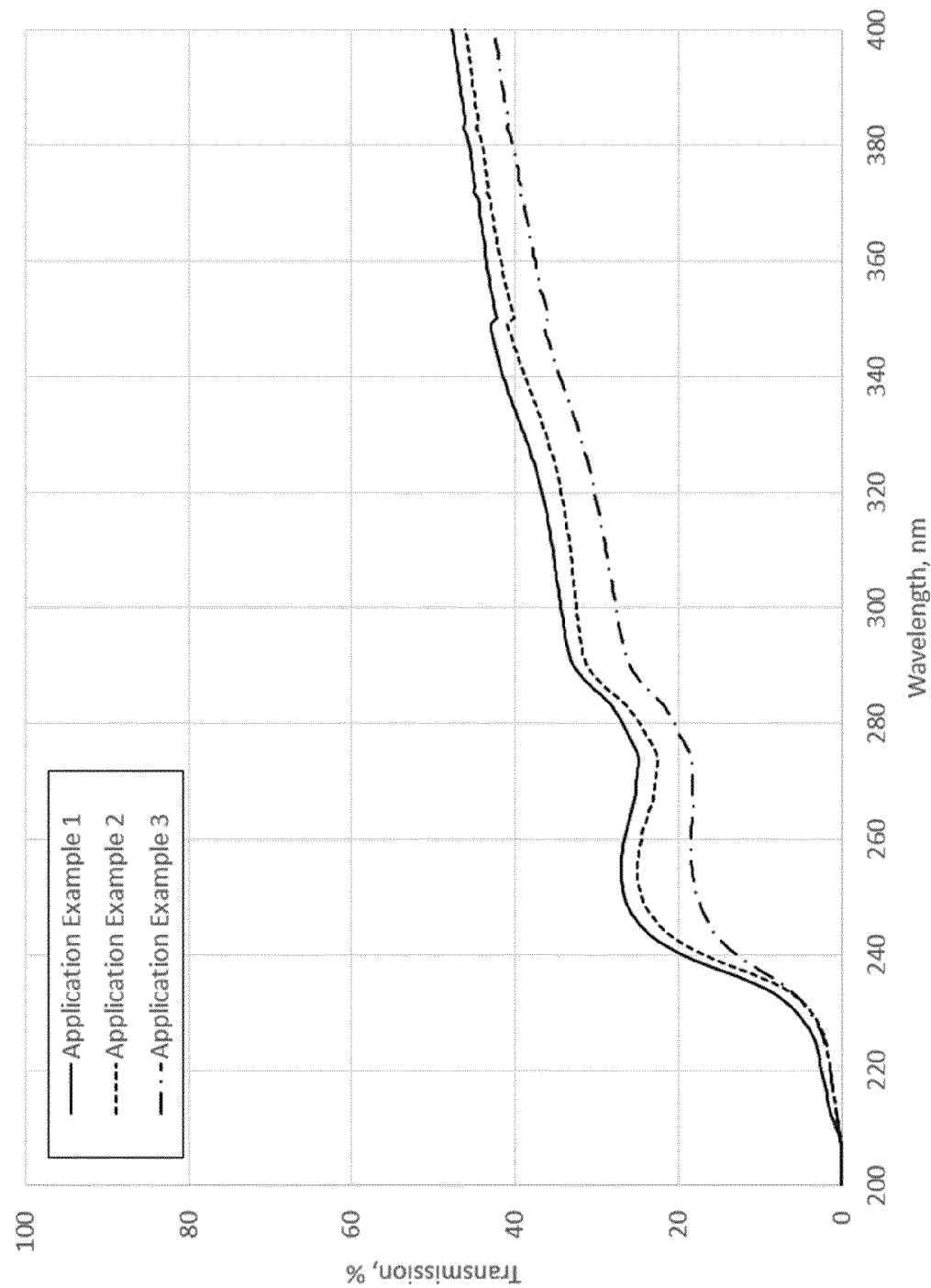
FIGS. 5 to 12 show transmission curves as results of the UV measurement for the indicated application examples.

The results of the UV measurements of Application Examples 1 to 3 are shown in FIG. 5. As can be seen the addition of the porous microspheres leads to a clear reduction of the transmission.

Irganox B215 is a mixture of the compounds of formulae

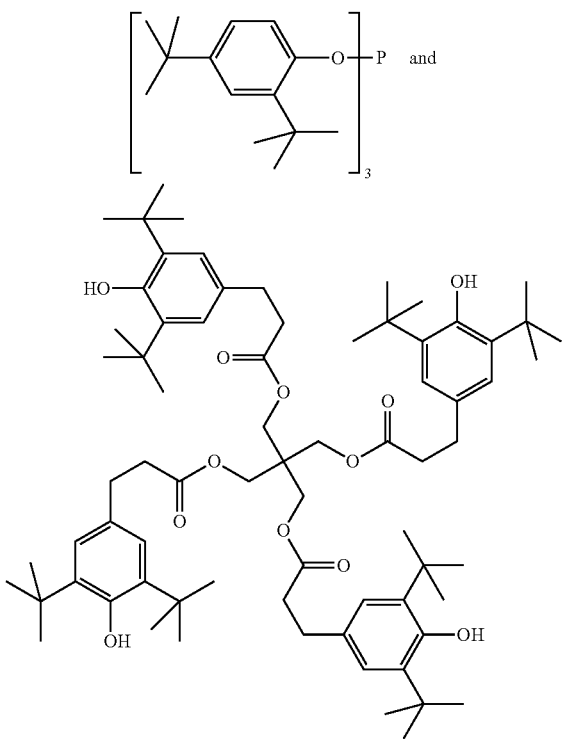

Application Examples 4 to 7

Polypropylene powder (Profax 6301, 12 g/10 min melt flow rate) is weighed in a 240 ml cup. An antioxidant (Irganox B 215), ultraviolet light absorber (Tinuvin® PA 328), and the porous silica microspheres of Synthesis Example 3 are weighed and mixed with the powder. The weights of the components for each sample are listed in Table 2, below.

TABLE 2

Weight and concentration of the components

| Sample Number | Polypropylene, g | Antioxidant, g | Ultraviolet Light Absorber, g | Porous silica microspheres, g |
|---|---|---|---|---|
| 4 | 49.95 | 0.05 | — | — |
| 5 | 49.9 | 0.05 | 0.05 | — |
| 6 | 49.65 | 0.05 | 0.05 | 0.25 |
| 7 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 6:
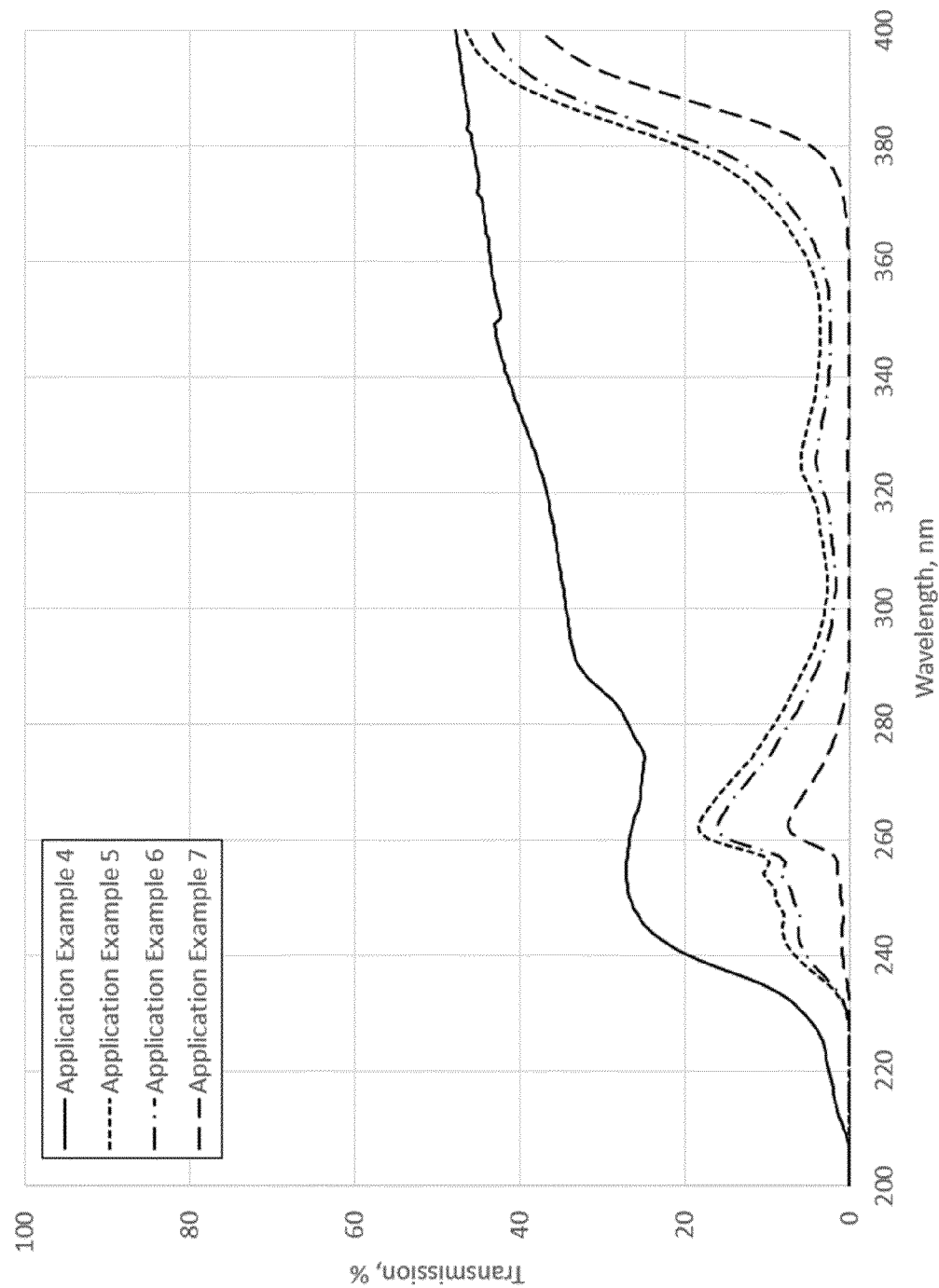

The results of the UV measurements of Application Examples 4 to 7 are shown in FIG. 6. As can be seen the use of a mixture of porous microspheres with Ultraviolet Light Absorber leads to a significant reduction of the transmission, which can even be reduced in a certain range of the wavelength close to zero.

Tinuvin® PA 328 is the compound of formula

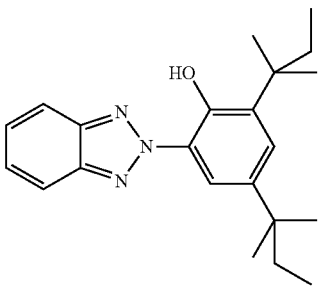 [SMILES: CCC(C)(C)c1cc(-n2nc3ccccc3n2)c(O)c(C(C)(C)CC)c1]

Application Examples 8 and 9

Polypropylene powder (Profax 6301, 12 g/10 min melt flow rate) is weighed in a 240 ml cup. An antioxidant (Irganox B 215), ultraviolet light absorber (Tinuvin® 326), and the porous silica microspheres of Synthesis Example 3 are weighed and mixed with the powder. The weights of the components for each sample are listed in Table 3, below.

TABLE 3

Weight and concentration of the components

| Sample Number | Polypropylene, g | Antioxidant, g | Ultraviolet Light Absorber, g | Porous silica microspheres, g |
|---|---|---|---|---|
| 8 | 49.9 | 0.05 | 0.05 | — |
| 9 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 7:
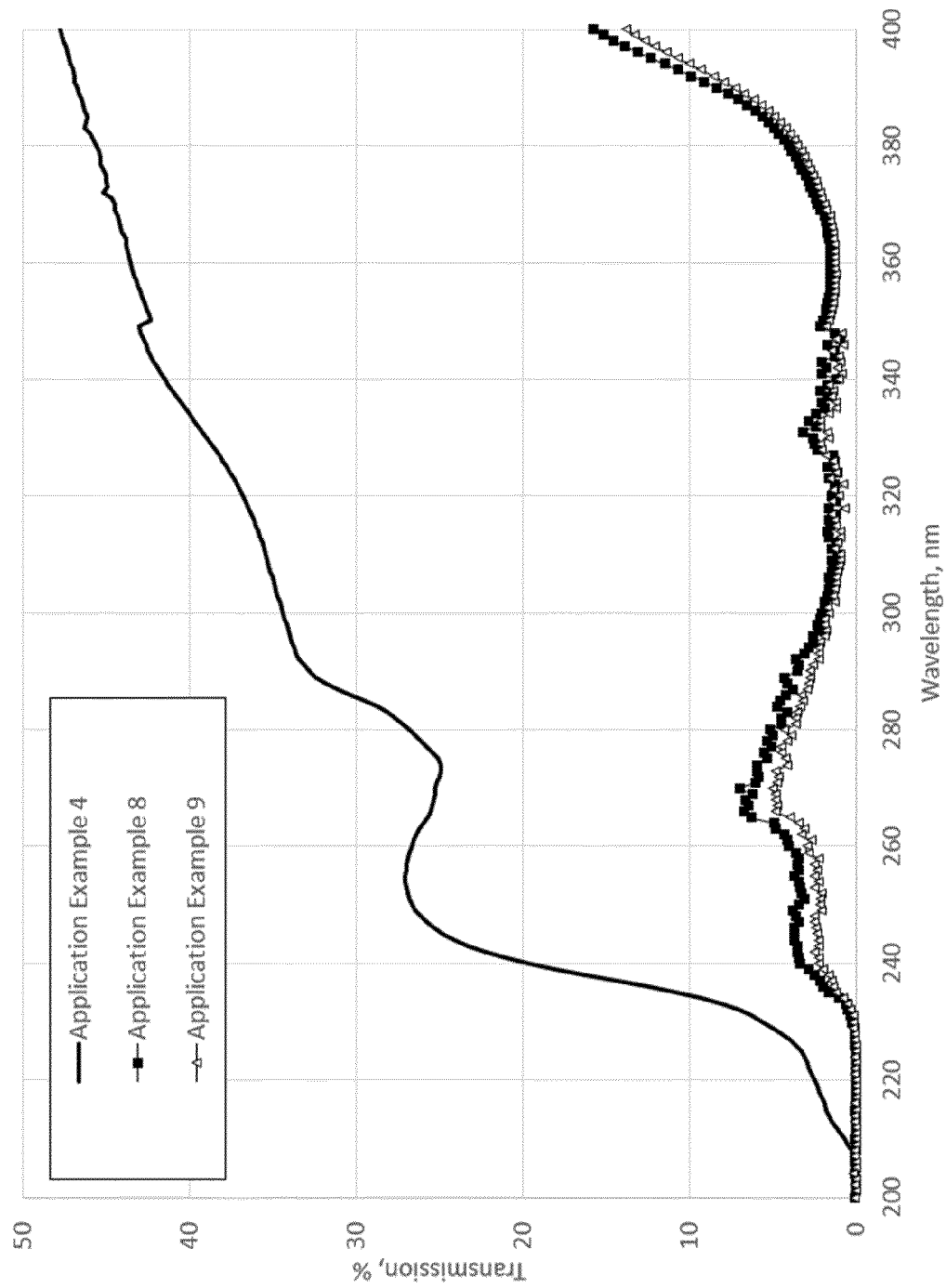

The results of the UV measurements of Application Examples 8 to 9 are shown in FIG. 7. As can be seen the use of a mixture of porous microspheres with Ultraviolet Light Absorber leads to a significant reduction of the transmission, which can even be reduced in a certain range of the wavelength close to zero.

Tinuvin 326® is the compound of formula

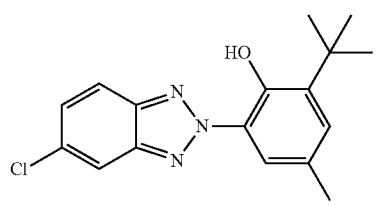 [SMILES: Cc1cc(-n2nc3ccc(Cl)cc3n2)c(O)c(C(C)(C)C)c1]

Application Examples 10 and 11

Polypropylene powder (Profax 6301, 12 g/10 min melt flow rate) is weighed in a 240 ml cup. An antioxidant (Irganox B 215), ultraviolet light absorber (Chimassorb® 81), and the porous silica microspheres of Synthesis Example 3 are weighed and mixed with the powder. The weights of the components for each sample are listed in Table 4, below.

TABLE 4

Weight and concentration of the components

| Sample Number | Polypropylene, g | Antioxidant, g | Ultraviolet Light Absorber, g | Porous silica microspheres, g |
|---|---|---|---|---|
| 10 | 49.9 | 0.05 | 0.05 | — |
| 11 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 8:
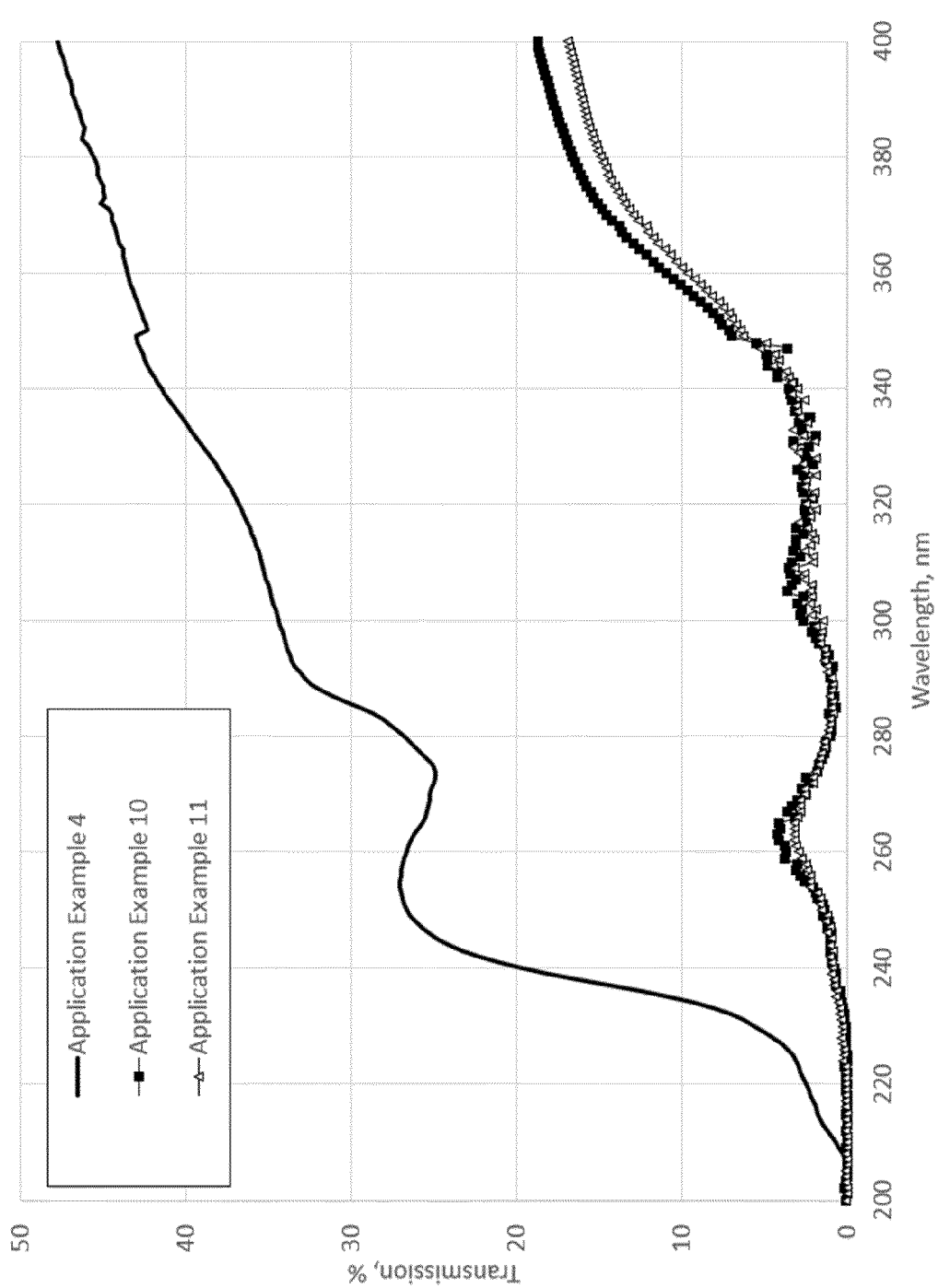

The results of the UV measurements of Application Examples 10 and 11 are shown in FIG. 8. As can be seen the use of a mixture of porous microspheres with Ultraviolet Light Absorber leads to a significant reduction of the transmission, which can even be reduced in a certain range of the wavelength close to zero.

Chimassorb® 81 is the compound of formula

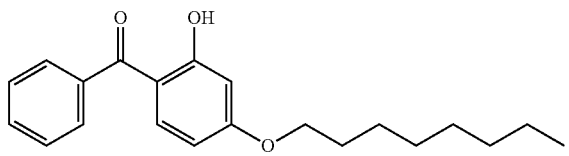 [SMILES: CCCCCCCCOc1ccc(C(=O)c2ccccc2)c(O)c1]

Application Examples 12 and 13

Polypropylene powder (Profax 6301, 12 g/10 min melt flow rate) is weighed in a 240 ml cup. An antioxidant (Irganox B 215), ultraviolet light absorber (Tinuvin® 1577), and the porous silica microspheres of Synthesis Example 3 are weighed and mixed with the powder. The weights of the components for each sample are listed in Table 5, below.

TABLE 5

Weight and concentration of the components

| Sample Number | Polypropylene, g | Antioxidant, g | Ultraviolet Light Absorber, g | Porous silica microspheres, g |
|---|---|---|---|---|
| 12 | 49.9 | 0.05 | 0.05 | — |
| 13 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 9:
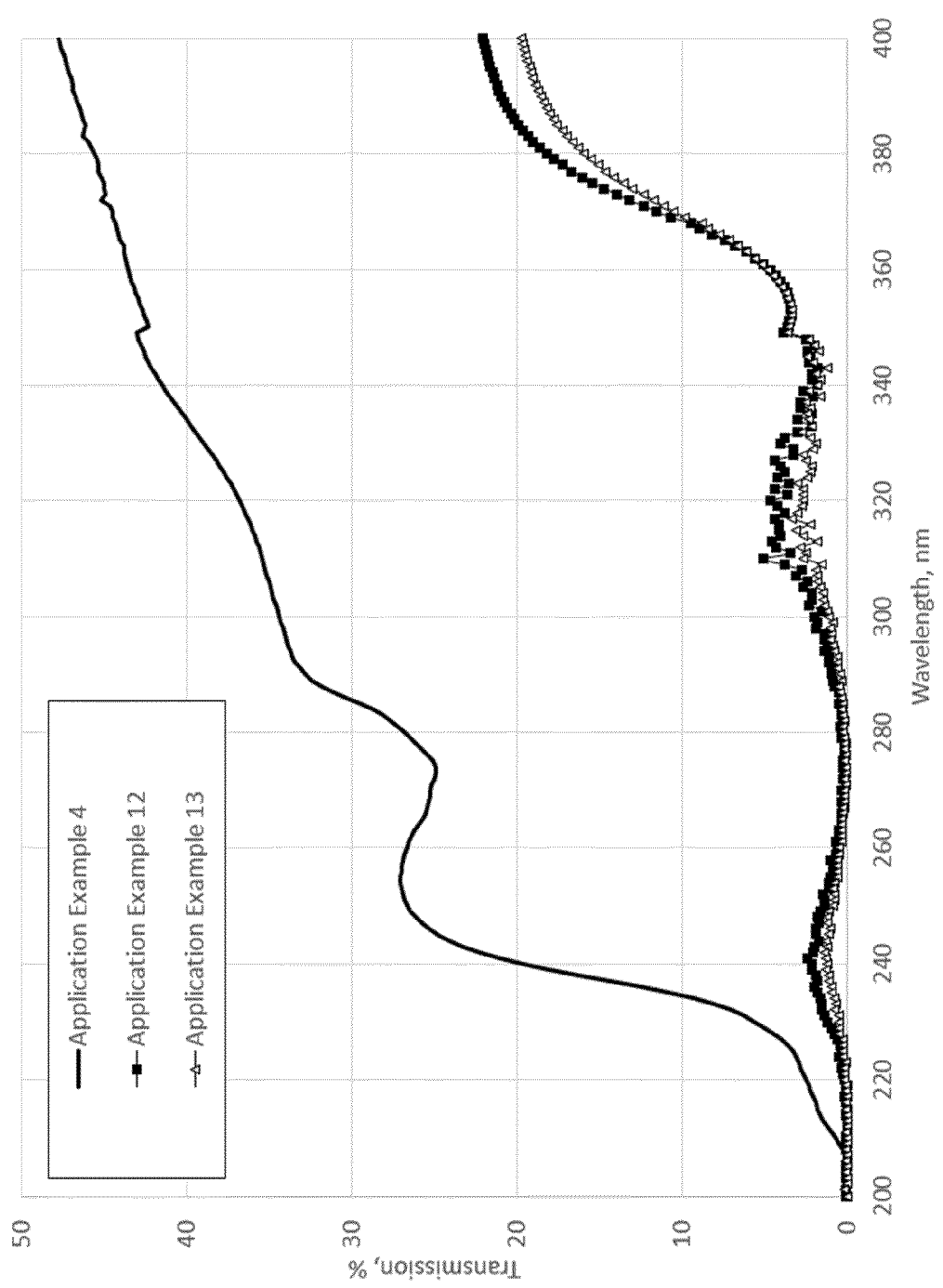

The results of the UV measurements of Application Examples 12 and 13 are shown in FIG. 9. As can be seen the use of a mixture of porous microspheres with Ultraviolet Light Absorber leads to a significant reduction of the transmission, which can even be reduced in a certain range of the wavelength close to zero.

Tinuvin 1577® is the compound of formula

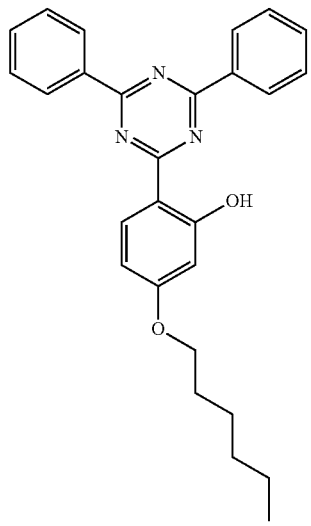 [SMILES: CCCCCCOc1ccc(-c2nc(-c3ccccc3)nc(-c3ccccc3)n2)c(O)c1]

Application Examples 14 and 15

Polypropylene powder (Profax 6301, 12 g/10 min melt flow rate) is weighed in a 240 ml cup. An antioxidant (Irganox B 215), ultraviolet light absorber (Uvinul® 3035), and the porous silica microspheres of Synthesis Example 3 are weighed and mixed with the powder. The weights of the components for each sample are listed in Table 6, below.

TABLE 6

Weight and concentration of the components

| Sample Number | Polypropylene, g | Antioxidant, g | Ultraviolet Light Absorber, g | Porous silica microspheres, g |
|---|---|---|---|---|
| 14 | 49.9 | 0.05 | 0.05 | — |
| 15 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 10:
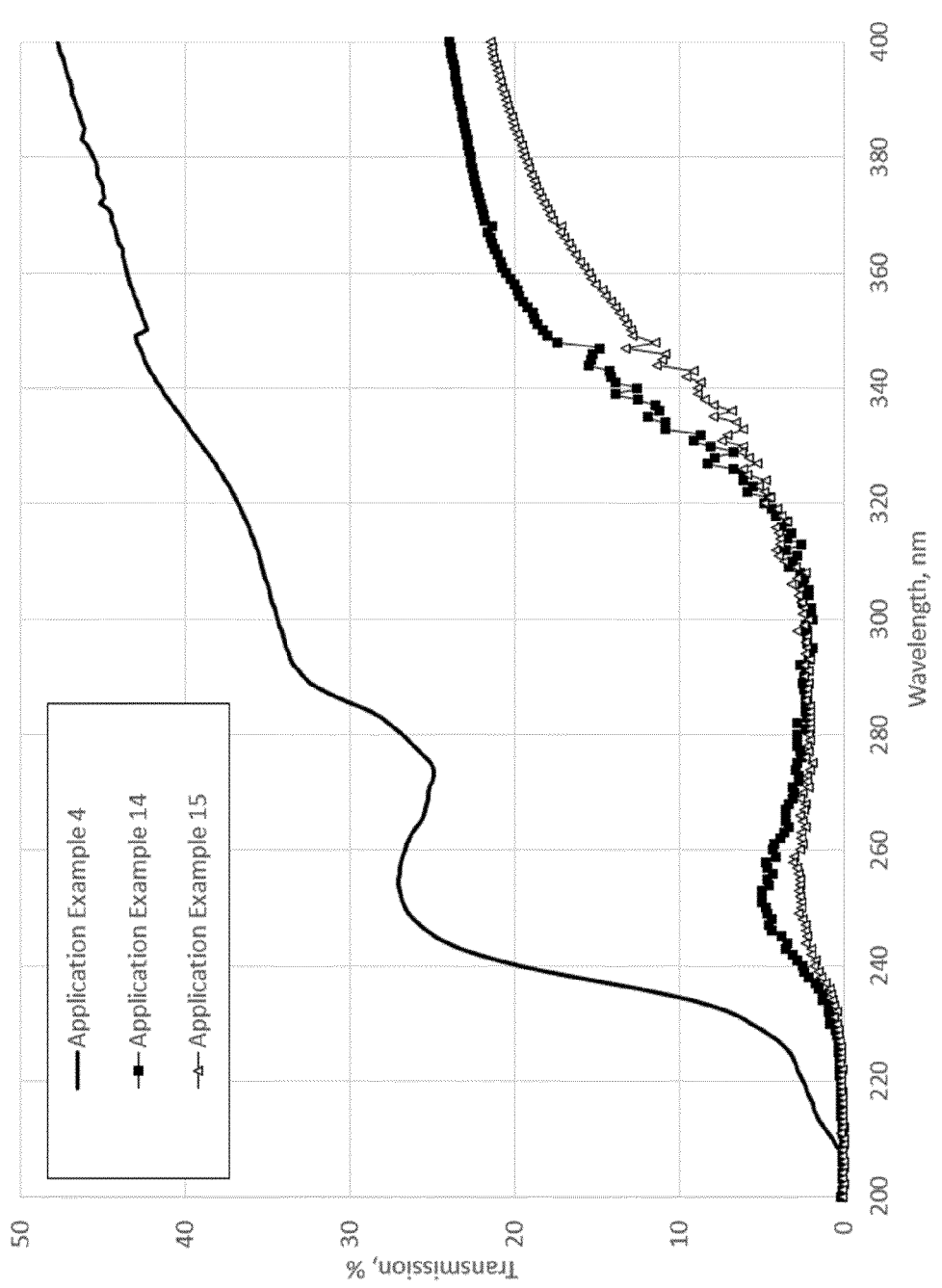

The results of the UV measurements of Application Examples 14 and 15 are shown in FIG. 10. As can be seen the use of a mixture of porous microspheres with Ultraviolet Light Absorber leads to a significant reduction of the transmission, which can even be reduced in a certain range of the wavelength close to zero.

Uvinul 3035® is the compound of formula

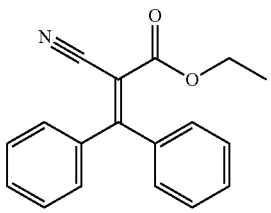 [SMILES: CCOC(=O)C(C#N)=C(c1ccccc1)c1ccccc1]

Application Examples 16 and 17

Polyethylene powder (Microthene MN 700 LDPE, 20 g/10 min melt flow rate) is weighed in a 240 ml cup. An antioxidant (Irganox B 215), ultraviolet light absorber (Tinuvin® 326), and the porous silica microspheres of Synthesis Example 3 are weighed and mixed with the powder. The weights of the components for each sample are listed in Table 7, below.

TABLE 7

Weight and concentration of the components

| Sample Number | Polyethylene, g | Antioxidant, g | Ultraviolet Light Absorber, g | Porous silica microspheres, g |
|---|---|---|---|---|
| 16 | 49.9 | 0.05 | 0.05 | — |
| 17 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 μm at 218° C. for three minutes under low pressure followed by three minutes under high pressure. The mold is then cooled in the compression molder for three minutes. A 5 cm×5 cm square is cut from the sheet for UV-Vis measurement.

Figure 11:
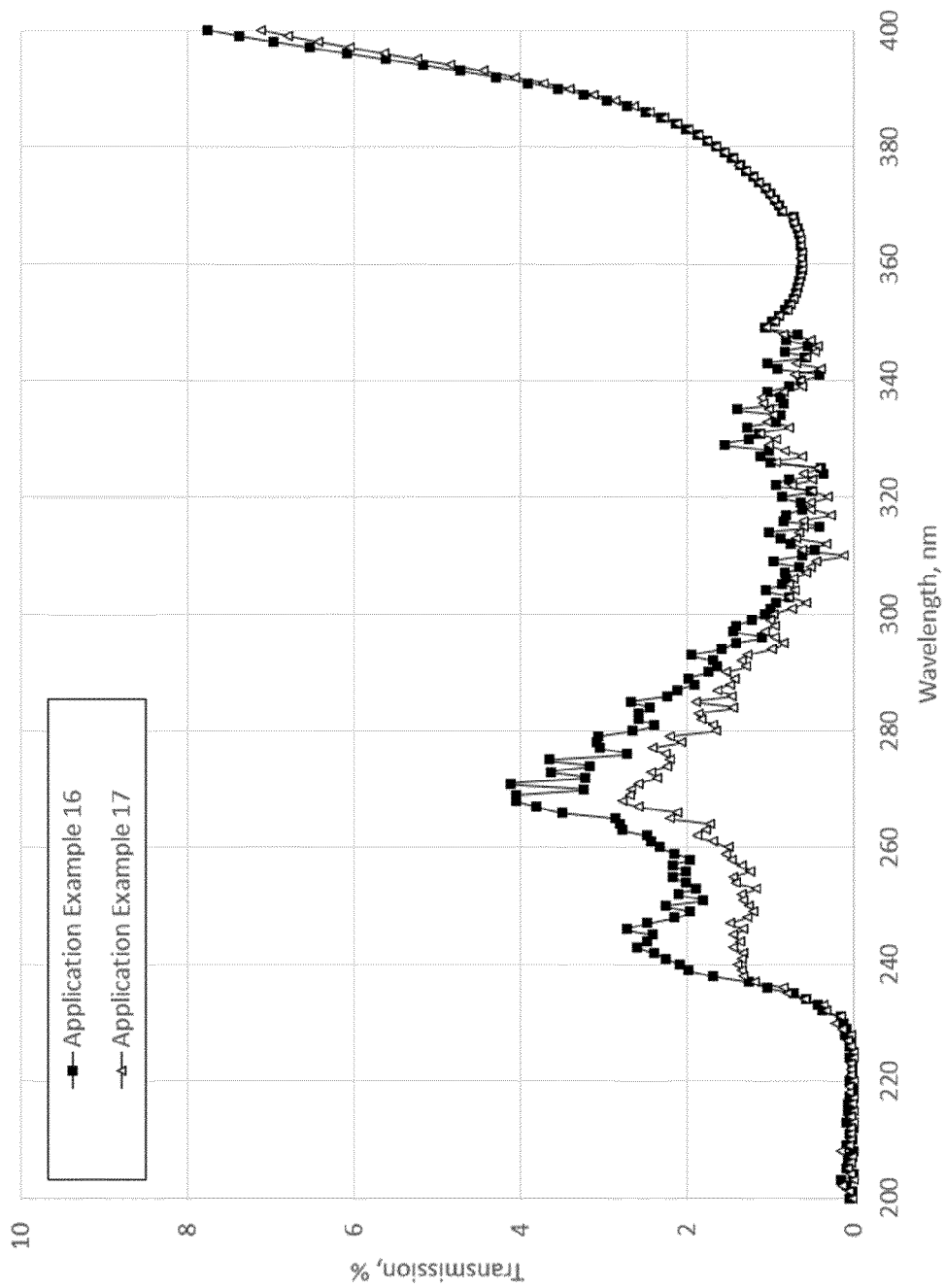

The results of the UV measurements of Application Examples 16 and 17 are shown in FIG. 11. As can be seen the use of a mixture of porous microspheres with Ultraviolet Light Absorber leads to a significant reduction of the transmission, which can even be reduced in a certain range of the wavelength close to zero.

Application Examples 18 and 19

Polyethylene powder (Microthene MN 700 LDPE, 20 g/10 min melt flow rate) is weighed in a 240 ml cup. An antioxidant (Irganox B 215), ultraviolet light absorber (Chimassorb® 81), and the porous silica microspheres of Synthesis Example 3 are weighed and mixed with the powder. The weights of the components for each sample are listed in Table 8, below.

TABLE 8

| | Weight and concentration of the components | | | |
|---|---|---|---|---|
| Sample Number | Polyethylene, g | Antioxidant, g | Ultraviolet Light Absorber, g | Porous silica microspheres, g |
| 18 | 49.9 | 0.05 | 0.05 | — |
| 19 | 49.15 | 0.05 | 0.05 | 0.75 |

The polymer mixture is placed in a preheated C. W. Brabender Plasti-Corder at 210° C. and mixed for three minutes at 50 rpm to achieve a homogenous molten mixture. The molten polymer is then compression molded to a thickness of 250 µm at 218° C. for three minutes under low pressure followed by three minutes under high pressure. The mold is then cooled in the compression molder for three minutes. A 5 cm×5 cm square is cut from the sheet for UV-Vis measurement.

Figure 12:
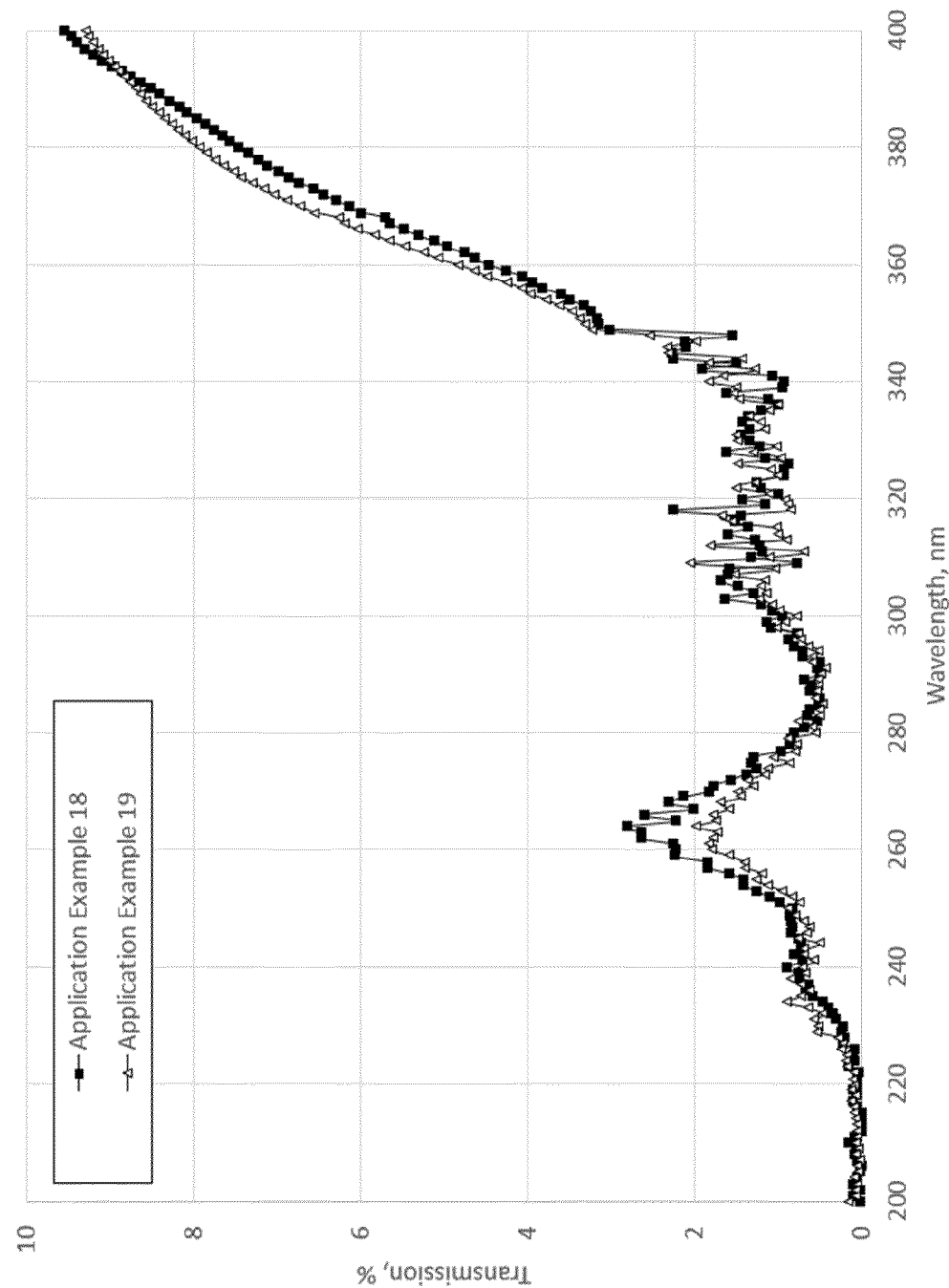

The results of the UV measurements of Application Examples 18 and 19 are shown in FIG. 12. As can be seen the use of a mixture of porous microspheres with Ultraviolet Light Absorber leads to a significant reduction of the transmission, which can even be reduced in a certain range of the wavelength close to zero.

Elongation at Break

The samples of the application examples can be exposed in an Atlas Weather-O-Meter (WOM, as per ASTM G155, 0.35 W/m2 at 340 nm, dry cycle), for accelerated light weathering. Speci-mens of the film samples are taken at defined intervals of time after exposure and undergo tensile testing. The residual tensile strength is measured, by means of a Zwick© Z1.0 constant velocity tensiometer (as per modified ISO 527), in order to evaluate the decay of the mechanical properties of the samples, as a consequence of the polymer degradation after its oxidation. For the samples of Application Examples 2, 3, 6, 7, 9, 11, 13, 15, 17 and 19 the retained elongation at break (as % of initial) after 1000 hours WOM treatment is greater than 50%.

The invention claimed is:

1. A shaped artificial polymer article, wherein the polymer is a synthetic polymer and/or a natural or synthetic elastomer, and wherein the polymer contains porous metal oxide microspheres, wherein the porous metal oxide microspheres have:
an average diameter of from 0.5 µm to 100 µm,
an average porosity of from 0.10 to 0.80, and
an average pore diameter of from 50 nm to 999 nm.

2. The shaped artificial polymer article of claim 1, wherein the metal oxide is selected from the group consisting of silica, titania, alumina, zirconia, ceria, iron oxides, zinc oxide, indium oxide, tin oxide, chromium oxide and combinations thereof.

3. The shaped artificial polymer article of claim 1, wherein the porous metal oxide microspheres comprise from 50.0 wt % to 99.9 wt % metal oxide, based on the total weight of the microspheres.

4. The shaped artificial polymer article of claim 1, wherein the porous metal oxide microspheres have an average diameter of from 1 µm to 75 µm.

5. The shaped artificial polymer article of claim 1, wherein the porous metal oxide microspheres have an average porosity of from 0.45 to 0.65.

6. The shaped artificial polymer article of claim 1, wherein the porous metal oxide microspheres have an average pore diameter of from 50 nm to 800 nm.

7. The shaped artificial polymer article of claim 1, wherein the porous metal oxide microspheres have
an average diameter of from 1 µm to 75 µm,
an average porosity of from 0.45 to 0.65, and
an average pore diameter of from 50 nm to 800 nm.

8. The shaped artificial polymer article of claim 1, wherein the porous metal oxide microspheres have
an average diameter of from 4.5 µm to 9.9 µm,
an average porosity of from 0.45 to 0.65, and
an average pore diameter of from 220 nm to 300 nm.

9. The shaped artificial polymer article of claim 1, wherein the porous metal oxide microspheres are used in a concentration of from 0.01 wt % to 20.0 wt %, based on the total weight of the shaped artificial polymer article.

10. The shaped artificial polymer article of claim 1, wherein the porous metal oxide microspheres are present in combination with one or more UV absorbers, and wherein the UV absorbers are selected from the group consisting of 2-hydroxyphenyltriazines, benzotriazoles, 2-hydroxybenzophenones, oxalanilides, cinnamates, and benzoates.

11. The shaped artificial polymer article of claim 10, wherein the one or more UV absorbers are used in a concentration of from 0.01 wt % to 20.0 wt %, based on the total weight of the shaped artificial polymer article.

12. The shaped artificial polymer article of claim 1, wherein the shaped artificial polymer article comprises a hindered amine light stabilizer (HALS).

13. The shaped artificial polymer article of claim 1, wherein the shaped artificial polymer article is a film, pipe, cable, tape, sheet, container, frame, fibre or monofilament.

* * * * *